US008585892B2

(12) United States Patent
Robertson et al.

(10) Patent No.: US 8,585,892 B2
(45) Date of Patent: Nov. 19, 2013

(54) SYSTEM AND PROCESS FOR REMOVING NITROGEN COMPOUNDS AND ODORS FROM WASTEWATER AND WASTEWATER TREATMENT SYSTEM

(75) Inventors: Mark B. Robertson, Gainesville, FL (US); David O'Keefe, Gainesville, FL (US); John D. Cox, Gainesville, FL (US); Daniel T. White, Gainesville, FL (US)

(73) Assignee: Biofilter Systems, LLC, Gainesville, FL (US)

( * ) Notice: Subject to any disclaimer, the term of this patent is extended or adjusted under 35 U.S.C. 154(b) by 390 days.

(21) Appl. No.: 12/793,144

(22) Filed: Jun. 3, 2010

(65) Prior Publication Data

US 2011/0168616 A1    Jul. 14, 2011

Related U.S. Application Data

(60) Provisional application No. 61/294,521, filed on Jan. 13, 2010.

(51) Int. Cl.
*B01D 17/12* (2006.01)
*C02F 9/02* (2006.01)
*C02F 9/14* (2006.01)

(52) U.S. Cl.
USPC ............ 210/85; 210/96.1; 210/143; 210/151; 210/259; 210/614; 210/919; 700/273; 702/50

(58) Field of Classification Search
USPC ........ 210/85, 143, 151, 257.1, 258, 259, 521, 210/52, 614, 767, 806, 919, 522, 920; 700/273, 282; 702/45, 50; 705/1.1, 37, 705/412, 413
See application file for complete search history.

(56) References Cited

U.S. PATENT DOCUMENTS

| 3,980,556 A | 9/1976 | Besik |
| 4,033,875 A | 7/1977 | Besik |
| 4,104,167 A | 8/1978 | Besik |

(Continued)

OTHER PUBLICATIONS

Lauria, Jim. "Economy, Efficiency Drive Trend Toward Decentralized Water Treatment". Water Online The Magazine, Clearwater Edition May 7, 2012: p. 8-10 <http://proddownloads.vertmarkets.com.s3.amazonaws.com/download/d9c4784b/d9c4784b-af99-4a87-8779-a04a003909ed/original/8_cleanwater_2012_teamchem_s.pdf>.

(Continued)

*Primary Examiner* — Joseph Drodge
(74) *Attorney, Agent, or Firm* — Mayback & Hoffman, P.A.; Gregory L. Mayback

(57) ABSTRACT

A wastewater treatment system includes independent wastewater treatment facilities. Each of the facilities has a number of wastewater treatment subsystems. A wastewater collection subsystem holds wastewater to be treated. A pump subsystem moves wastewater from a wastewater collector to a filtration subsystem having a bioreacting filter. The filter has a sump and a fluidized-bed filter therein and supports the filter upright. The filter has an upwardly expanding, hollow, conical filter body with filter media. A monitoring subsystem measures wastewater process parameters. Control devices receive control commands and, dependent upon the command received, alter parameters of the wastewater treatment subsystems. A communication device connects the wastewater treatment subsystems and the control devices and sends information corresponding to the wastewater process parameters measured by the monitors, receives control messages corresponding to the control commands, and transmits control commands the control devices to, thereby, alter a wastewater process parameter.

20 Claims, 10 Drawing Sheets

(56) References Cited

U.S. PATENT DOCUMENTS

| | | | |
|---|---|---|---|
| 4,202,774 A | 5/1980 | Kos | |
| 4,869,815 A * | 9/1989 | Bernard et al. | 210/151 |
| 5,320,750 A * | 6/1994 | Krofta | 210/221.2 |
| 5,505,862 A * | 4/1996 | Sonnenrein | 210/608 |
| 5,514,277 A | 5/1996 | Khudenko | |
| 5,618,413 A | 4/1997 | Todd et al. | |
| 5,792,368 A | 8/1998 | Robertson | |
| 5,863,441 A * | 1/1999 | Krofta | 210/703 |
| 5,879,567 A | 3/1999 | Robertson | |
| 6,143,187 A | 11/2000 | Robertson | |
| 6,159,365 A * | 12/2000 | Kigel et al. | 210/151 |
| 6,174,434 B1 * | 1/2001 | Krofta | 210/221.2 |
| 6,605,219 B2 | 8/2003 | Lambert | |
| 6,845,336 B2 * | 1/2005 | Kodukula et al. | 702/118 |
| 7,062,406 B2 | 6/2006 | Patwardhan et al. | |
| 7,096,128 B2 * | 8/2006 | Saylor | 702/45 |
| 7,353,113 B2 * | 4/2008 | Sprague et al. | 702/2 |
| 7,424,399 B2 * | 9/2008 | Kahn et al. | 702/188 |
| 7,566,400 B2 * | 7/2009 | Harmon et al. | 210/631 |
| 2003/0209476 A1 * | 11/2003 | Josse et al. | 210/151 |
| 2004/0230455 A1 * | 11/2004 | McKinney et al. | 705/1 |
| 2006/0000782 A1 * | 1/2006 | Bowers et al. | 210/714 |
| 2006/0021924 A1 | 2/2006 | White et al. | |
| 2007/0163965 A1 | 7/2007 | Wolfe | |
| 2008/0073266 A1 | 3/2008 | McWhirter et al. | |
| 2008/0201018 A1 | 8/2008 | Graves | |
| 2008/0225762 A1 * | 9/2008 | Soliman | 370/310 |
| 2009/0107924 A1 * | 4/2009 | Kigel et al. | 210/758 |
| 2010/0282654 A1 | 11/2010 | Hauschild | |

OTHER PUBLICATIONS

International Search Report, International Application No. PCT/US11/20967: dated Mar. 23, 2011.

"U.N. Report: Let's Turn Foul Water From Mass Killer Into Global Treasure." CNN Health. Mar. 22, 2010. <http://us.cnn.com/2010/HEALTH/03/22/united.nations.water.report/index.html?hpt=C2>.

"Time to Cure Global Tide of Sick Water". United Nations Environment Programme. Mar. 22, 2010. <http://www.unep.org/Documents.Multilingual/Default.asp?DocumentID=617&ArticleID=6504&l=en&t=long>.

* cited by examiner

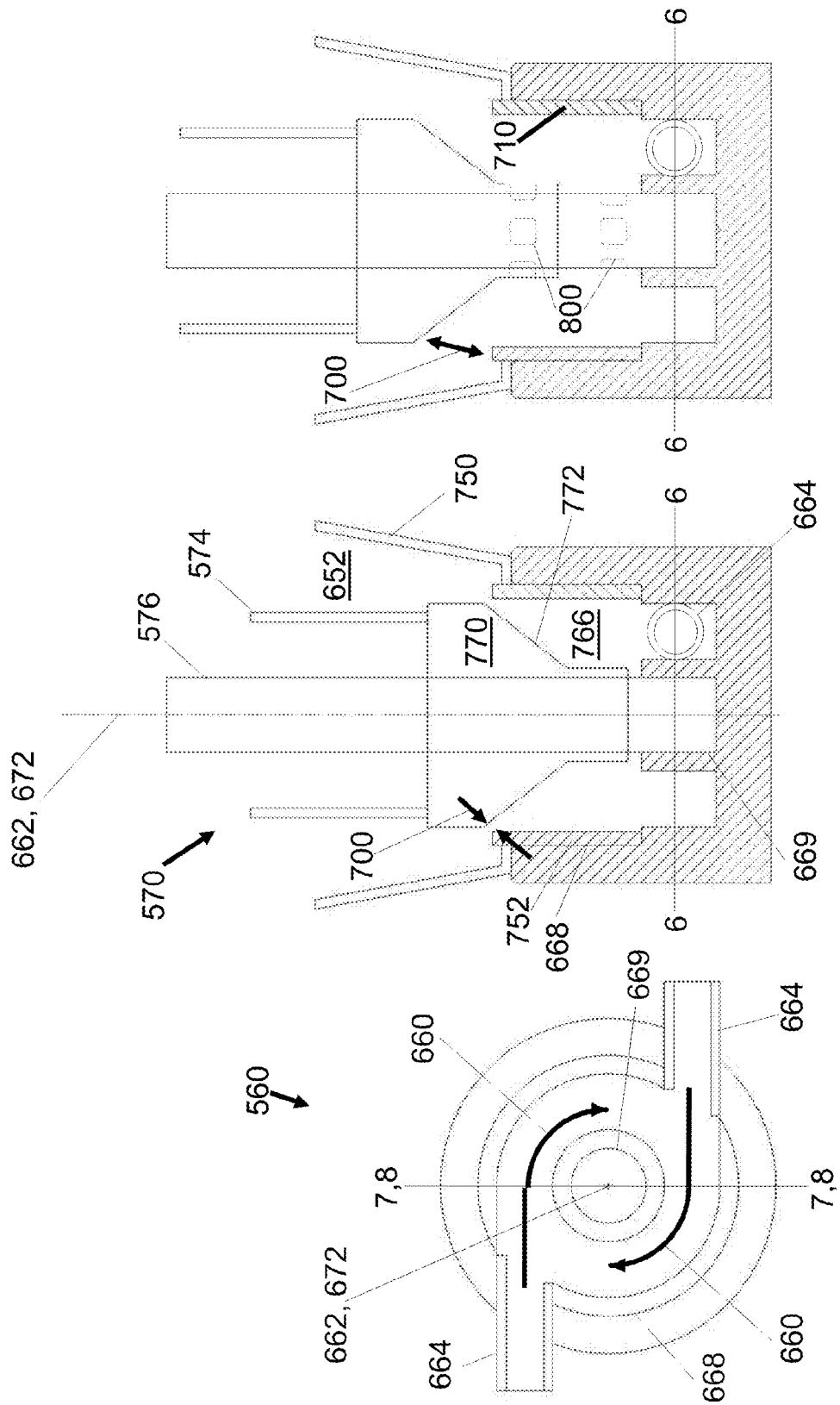

SYSTEM AND PROCESS FOR REMOVING NITROGEN COMPOUNDS AND ODORS FROM WASTEWATER AND WASTEWATER TREATMENT SYSTEM

CROSS-REFERENCE TO RELATED APPLICATION

This application claims the priority, under 35 U.S.C. §119, of U.S. Provisional Patent Application Ser. No. 61/294,521 filed Jan. 13, 2010, the entire disclosure of which is hereby incorporated herein by reference in its entirety.

FIELD OF THE INVENTION

The present invention lies in the field of removing waste and odors from wastewater using multi-zone aerobic and/or anaerobic fluidized expansion chambers. Waste can include, but is not limited to, nitrogenous waste such as ammonia, nitrite, and nitrate. In an exemplary embodiment, the present disclosure relates to system and processes for processing wastewater arising from confined animal feeding operations (CAFOs). The invention further includes a web-based wastewater treatment monitoring and control system.

BACKGROUND OF THE INVENTION

Microbial denitrification is a frequently used and inexpensive method of removing nitrogenous waste from wastewater. Two common configurations utilize either packed beds (also referred to as fixed film) or fluidized beds. Denitrifying microbial cultures have been supported on a variety of substrates including sand, ceramics, polymers, clay, and gels, to name a few. Fluidized bed denitrification systems offer a cost-effective solution to wastewater treatment, as they are self-adapting and provide a very large reactive surface area for a given volume compared to fixed film-based filtration systems. The primary disadvantage of microbial systems (or bioreactors) is that the organisms require an environment conducive to supporting their metabolic needs. While biological treatment systems can be flexible and robust, temperature, pH, oxygen content, and contaminant levels are variables to be controlled for optimum performance. Despite this requirement, microbial denitrification is still a cost effective way to treat wastewater.

Such systems can, and typically are, used in conjunction with other wastewater unit processes to achieve acceptable levels of biological oxygen demand (BOD) and/or the removal of other pollutants including, but not limited to, phosphorus, nitrogen, heavy metals, miscellaneous solids, and toxic organics.

The U.S. Department of Agriculture (USDA) and the U.S. Environmental Protection Agency (EPA) promulgate regulations that require entities generating wastewater to confine the discharge to permissible levels. Examples of regulated materials and chemicals included in discharged wastewater are ammonia, phosphates, nitrates, nitrites, and heavy metals. Typically, entities generating wastewater create holding ponds at their site. These ponds can be part of the treatment system and act as storage structures for the wastewater before, during, and after processing. Some processes allow the entities to either discharge their effluent to local waterways, others recycle the treated water by reusing it, for example, for cleaning or irrigation. Addition of wastewater treatment systems prior to these holding facilities can reduce the size required for these holding ponds.

Various entities spend millions of dollars annually to treat their wastewater. The cost of discharging untreated water to a municipal wastewater treatment facility can be prohibitive. In addition, every dollar spent on such discharge could have been spent on other, more beneficial, endeavors, including, for example, improvements to facilities.

Some existing denitrification filters may use a fluidized bed bioreactor having an inverted cone shape. Such a configuration optimizes the active volume of the bioreactor and reduces the volume and pumping requirements for any given throughput due to the high velocity of the liquid at the small part of the cone relative to the average liquid velocity of the entire vessel. An exemplary configuration of a fluidized bed reactor is shown in FIG. 1. In this filter, wastewater W is injected through the top of the filter element through a pipe that discharges at the base of the fluidized bed reactor. In FIGS. 1 and 2, the exemplary filter 100 can receive water to be treated W from either of two input bulkheads 110. Passing through horizontal fill pipes 120, the water W enters a vertical injector pipe 130 and exits out ports 140 adjacent the lowermost end of the vertical injector pipe 130 into the interior 102 of the filter body. Accordingly, the high-pressure stream of water W is forced upwards through the column of bed material 150, e.g., sand (not shown but indicated by dotted underline), which material 150 fills a lowermost portion of the filter's interior (for example, up to fill line 160 when dry). As the water W mixes with the bed material 150, it creates a fluidized bed having an upper boundary above fill line 160. A cone-shaped filter maximizes the efficiency of the fluidization within the column of the fluidized bed. An ideal fluidized bed reactor is one where the entire volume of the bed material becomes fluidized. Cone shaped fluidized beds (compared to straight cylinders) are more tolerant of variations in flow rates and media size uniformity that can lead to media washout in cylinders. It is beneficial if this filter system design is self-leveling and has a built-in overflow capability. To function best, however, a fluidized bed's long axis should be oriented as close to vertical as possible.

In FIGS. 1 and 2, if the filter uses standard 3-inch diameter plumbing, for example, then standard 3-inch parts can be used. At the top of the plumbing, a 3-inch DWV clean out 200 can be connected to a 3-inch cross 202. The horizontal fill pipes 120 can comprise a pair of 3-inch by 7.25-inch sch-160 PVC fittings each on opposing sides of the cross 202 with each being connected to one of a pair of 3-inch by 20.5-inch sch-160 PVC fittings through a 3-inch compression coupling 204. Each of the horizontal fill pipes 120 can be terminated by one of the two input bulkheads 110. The hatched areas of the pipes connected to the cross 202 illustrate the cement joints of the respective pipes. The vertical injector pipe 130 can be a 3-inch by 89-inch sch-160 PVC pipe that is terminated at the bottom thereof by a 4-inch bulkhead 206 holding a 3-inch drain gate 208, a 4-inch by 2-inch bushing 210, and, finally, a 2-inch plug 212. In this exemplary embodiment, four 1.5-inch holes, 2.5-inches on center are at the lower end of the vertical injector pipe 130.

An exemplary diagram for a denitrification process flow that can use a fluidized bed reactor 100 is provided in FIG. 3. Effluent wastewater W is introduced into a set 300 of sumps and filters that are configured in series because microbial reduction of ammonia in an influent stream is a multi-stage process. In a first stage 310, ammonia ($NH_3$) is converted to nitrate ($NO_3$) in the presence of oxygen, an aerobic process called nitrification. Oxygen can be added either as $O_2$ or as a constituent of air. Nitrates are as problematic as ammonia as a contaminant in waste streams. Accordingly, they must be treated as well. As such, in a second stage 320, nitrates are converted to atmospheric nitrogen ($N_2$) in an anaerobic process called denitrification. The number of aerobic and anaerobic filters in any given system is not fixed, but rather depends on the nature of the wastewater being treated and the desired characteristics of the system effluent. FIG. 3 shows a configuration where the first aerobic stage is succeeded by two anaerobic stages. As shown in FIG. 3, the influent W is discharged into an aerobic sump 312 where air 330, for example, is injected to maintain an adequate oxygen concentration sufficient for the aerobic microbes in the ammonia reduction stage of the process. This aerated water is recirculated through a first set of two fluidized bed reactors 314. Aerobically treated water $W_1$ from the aerobic sump 312 then flows to the first of two series-connected anaerobic sumps 322, 324. A second set of two fluidized bed reactors 326 recirculate influent water $W_1$ within a first anaerobic sump 322, which discharges partially treated water $W_2$ to a second anaerobic sump 324, at which a third set of two fluidized bed reactors 328 recirculate fluid therein. Denitrified water $W_3$ flows out of the second anaerobic sump 324 to a final sump 340, where any number of secondary removal systems 350 can be present. For example, if another pollutant is to be removed, then a secondary removal system 350 can be used. Treated water $W_4$ from this final sump 340 can then either be recycled or discharged. Possible direction of the treated water $W_4$ can be to a storage pond, a natural water body, and/or to a wastewater treatment facility as desired. Each of the sumps 312, 322, 324 can be accommodated to fit the needs of a particular facility.

The basic chemical process for treatment of the liquid in the first stage 310 involves aerating a stream of ammonia-rich wastewater and introducing this wastewater to an aerobic sand filter(s) where it first contacts an aerated zone. Here, the ammonia is converted to $NO_3$ as set forth in the following equation:

$$NH_4 + 2O_2 \rightarrow NO_3^- + 2H^+ + H_2O.$$

Then, the nitrate-rich effluent of the first stage 310 enters at least one anoxic filter where a high density of denitrifying bacteria converts the nitrate to $N_2$ as set forth in the following equation:

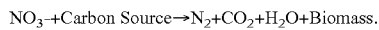
$$NO_3^- + \text{Carbon Source} \rightarrow N_2 + CO_2 + H_2O + \text{Biomass}.$$

This two-step process is represented in the schematic flow diagram of FIG. 4, which also includes the vertical orientation of influent and effluent within the system of FIG. 3. First, effluent wastewater W is introduced into the aerobic sump 312, the nitrification sump. Liquid from the nitrification sump 312 is removed from the bottom thereof and injected in the filter 314 through the lower port(s) 140. The pressure provided by the liquid coming out of the port 140 is made sufficient to maintain fluidization of the bed material in the filter 314. The fluid in the nitrification sump 312 is aerated, which aeration can occur directly in the nitrification sump 312 or indirectly in a separate aeration sump 312', the latter of which is shown in FIG. 4. In this first stage 310, ammonia converts to nitrate.

Ammonia-free liquid containing nitrate $W_1$ is, then, transferred to an anaerobic sump 322 of the second stage 320. Liquid from the anaerobic sump 322 is injected into the filter 324 through the lower port(s) 140. The pressure provided by the liquid coming out of the port 140 is made sufficient to maintain fluidization of the bed material in the filter 324. The fluid in the anaerobic sump 322 is not aerated, enabling nitrate in the filter 324 to convert to $N_2$. If further anaerobic filtration is needed to completely convert the nitrate, the portion of the second stage 320 shown in FIG. 4 can be repeated as desired (indicated with the ellipses in FIG. 4) and, as shown in FIG. 3, to transfer effluent $W_n$ from the anaerobic sump 322 to additional repetitive filtration stages.

It is desirable to remove as much solids from wastewater as possible before introducing the wastewater W into the denitrification system. One way to remove such solids is to first send the wastewater W to a solids separator (e.g., a screw press or inclined screen solids separator), in which some of the suspended solids are removed. These solids can be used as a soil amendment if desired. The liquid portion that exits from the solids separator can then be treated with the denitrification system to remove other contaminants.

Removal of nitrogen and odor causing contaminants from wastewater can allow for the reuse of this water for process and waste flushing purposes. Such a practice lowers fresh water usage, which is more environmentally friendly and cost effective than constantly using fresh water.

The flow of water needed to keep the fluidized sand filter systems fluidized often exceeds the overall flow of liquid through the system. As a result, fluidized sand filter systems have traditionally needed to be coupled with additional tankage (sumps) to hold the additional water needed to keep the beds fluidized. This need for additional tankage increases the footprint of the system by as much as two times. Accordingly, there is a need for a system that reduces this extra space for sumps.

Residences, commercial and industrial establishments generate wastewater or sewage. Sewage includes household waste from toilets, baths, kitchens and washing machines as well as wastewater produced from industrial processes like food and chemical production. In a typical metropolitan area all of these sources of wastewater are connected by a network of underground sewers to a sewage treatment plant where the water is processed to eliminate components in the water that could harm the environment. The sewer system includes pipes and pumping stations that move the wastewater from its sources to the waste treatment plant. Some sewer systems also handle storm water runoff. Sewage systems capable of handling storm water are called combined systems. These systems are expensive to operate as they must have the capacity to process surges of storm water along with the normal volume of sewage they treat. As a result, many municipalities have separate sewage and storm water treatment facilities.

Conventional sewage treatment generally includes three stages, generally referred to as primary, secondary and tertiary or advanced treatment. Primary treatment is a process in which raw sewage is screened or treated in holding basins to remove solids. In the holding basin, a scum layer forms and includes, for example, oil, grease, soap, and plastics. The solids and scum are separated from the water and the remaining liquid is, then, further processed. In the secondary treatment step, nutrients, organic constituents, and suspended solids are removed by bacterial organisms in a managed environment. Tertiary or advanced treatment involves the further nutrient and suspended solids removal and disinfection before it is discharged into the environment.

Sewage can also be treated close to where it is generated using septic tanks, biofilters, or aerobic treatment systems. These systems process the wastewater produced from residential, commercial, or agricultural sources at or near the location where they are generated. These systems, which include septic tanks, do not require extensive sewer systems and are, generally, used in locations where access to sewage treatment plants is not practical. Septic tanks employ physical and biological removal of organics similarly to conventional sewage treatment plant but do not have the capacity to handle large surges of wastewater. Because the water in a septic tank is discharged at the same rate it enters the system, the input waste stream can exceed the capacity of the system to process the water before it is discharged. As a result, these systems can and do discharge untreated sewage into the water table. This is a deleterious condition that needs to be eliminated.

Subdivisions and planned urban developments that are not located near sewage treatment plants sometimes use wastewater treatment systems called package plants. Package plants are miniature sewage treatment plants that are configured to handle the needs of a subdivision or an institution, such as a school, from which bathroom and cafeteria wastewater can be processed Like septic tanks, package plants can be hydraulically overloaded during peak loading hours, after lunch is served for example, when large volumes of wastewater enter the system, forcing contaminated water to be discharged before it can be properly processed. Preventing this condition would be desirable.

In municipal areas where large, centralized wastewater treatment facilities are established, sewage can be effectively processed and water discharged into the environment can be controlled and regulated. In rural areas where package plants and septic systems are employed, wastewater discharge into the environment is uncontrolled, largely unregulated and contaminants are routinely discharged into the environment. Preventing such discharge would be desirable.

The same is true for agricultural operations, particularly, large establishments like confined animal feeding operations and dairy farms. There are no standard agricultural wastewater treatment systems on the market. Typically each farming operator retains a wastewater treatment consultant and a custom system is designed to meet their individual needs. Due to the massive amounts of waste created by these facilities and the high cost of municipal-class treatment systems, agricultural waste processing systems often rely on large lagoons to provide secondary and tertiary processing of their waste. Unfortunately these systems are subject to failure due to overflow from heavy rains and leakage from the lagoon basin. Consequently, nutrient-rich water can be discharged into the aquifer and surrounding bodies of water. Preventing such discharge would be desirable.

Thus, a need exists to overcome the problems with the prior art systems, designs, and processes as discussed above.

SUMMARY OF THE INVENTION

The invention provides a multi-stage bioreactor for effluent denitrification and systems and methods for removing nitrogenous waste (e.g., ammonia, nitrite, nitrate) and odors from wastewater using multi-zone aerobic and/or anaerobic fluidized expansion chambers that overcome the hereinaforementioned disadvantages of the heretofore-known devices and methods of this general type and that provide such features with a reduced footprint and, in doing so, improves fluidization of the bed material.

The invention provides wastewater treatment systems and processes utilizing the multi-stage bioreactor that overcome the hereinafore-mentioned disadvantages of the heretofore-known devices and methods of this general type and that prevent contaminated water from being discharged and easily and routinely monitors the wastewater treatment system so that verification of non-discharge of contaminated water can be made.

The bioreactor portion of the invention pertains to systems and processes for treating nitrogenous pollutants and odors in wastewater through a controlled biological process. The primary element of control in the invention is a quantifiable control of wastewater velocity through the system utilizing a controlled interaction of vessel geometry with biological components of the system. Other control parameters of the systems and processes include pH, temperature, and oxygen saturation of the wastewater. Parameters of the systems and processes include some combination of the following:
1) Reduction of Biological Oxygen Demand (BOD);
2) Reduction of Odor;
3) Conversion of ammonia ($NH_3$) to nitrate ($NO_3$); and
4) Conversion of nitrate ($NO_3$) to atmospheric nitrogen ($N_2$).

Bacteria are maintained as a biofilm on solid media within a vessel of the inventive bioreactor. The solid media is particulate and of sufficient buoyancy to be suspended with a flow of water through the vessel. The degree of buoyancy is controlled by the velocity of water, the density of the particles, and the shape of the particles and is described by the equation:

$$\varepsilon = \left[\frac{18 N_{Re} + 2.7 N_{Re}^{1.687}}{N_{Ga}}\right]^{0.213}$$

where:
$\varepsilon$=bed void fraction;
$N_{Re}$=Particle Reynolds Number; and
$N_{Ga}$=Galileo Number,
and is further discussed in U.S. Pat. No. 4,032,407 to Scott et al., the disclosure of which is incorporated herein by reference in its entirety.

Processes of the invention involve decoupling treatment time and system flow-through using an improved sump feature. This feature optimizes the process to achieve a variety of process outcomes. For example, there is a reduction of odor while the nitrogen content of wastewater is maintained for fertilizer use by conversion of ammonia to nitrate while the conversion of nitrate to $N_2$ is inhibited.

This optimized control and monitoring system can be implemented not only for a single facility's wastewater treatment, but also can be expanded to monitor and document a community or watershed wide system of wastewater treatment facilities that permits later verification of no discharge or permissible discharge, throughout any particular time period of the facility's operational history. More specifically, the invention provides a solution to the problem of the verification of treating wastewater from rural and agricultural sources by creating a virtual wastewater treatment system including a network of independent treatment or filtration systems that are instrumented to measure critical process parameters such as process flows, water levels, water temperature, pH, nutrient concentration, total suspended solids, actual and potential effects of local weather conditions, and others. The data produced and recorded by these individual sub-systems are, then, transmitted electronically and captured at a central location, at which the received data is further analyzed and used to manage the systems remotely. The invention, thereby, provides oversight to the control and operation of the treatments systems being monitored.

On a local site level, parameters that are measured by various probes and instruments connect to a central processing unit (e.g., a personal computer), which contains and executes software that captures, processes, and records the sensed data and, then, remotely operates a number of responsive process control mechanisms such as valves, pumps, chemical dispensers, etc., to optimize the operation of a particular filtering system or to shut down one or more components or operations in the case of failure or need for repair. During times when the processed output exceeds the limits permitted for lawful or proper discharge (for example, the amount allowable under a particular permit), the invention can proactively divert output flow into a holding facility (i.e., tank or pond) for reprocessing until concentration levels at the wastewater system output achieve compliance, at which time permissible discharge can occur. This "smart" interactive process is capable of monitoring and reporting on a local or regional basis (by coordinating the monitoring of adjacent sites or sites on the same waterway) and in real-time, allowing numerous advantages in monitoring the actual and potential discharges into a natural system, not the least of which is to allow affected dischargers to trade, sell or exchange excess capacity or allowances.

Each of these treatment systems connects through the Internet or through other remote electronic measures to a central monitoring location, where operational parameters and maintenance of the systems can be observed and controlled. The monitoring location is able to view the data recorded by each treatment system, and, in an embodiment where a remote viewing system is used in conjunction therewith (for example, a web camera), operational problems are observed and diagnosed remotely. If any problems occur that need physical repair or service, a live technician could then be dispatched to fix the filter system or that filter could be shut down remotely or its output diverted remotely until proper operation of the filter was restored, thereby entirely preventing discharge of non-compliant water.

In this way, each of the treatment systems can be connected as a network to a central monitoring station where the output of all of the networked systems is monitored on a continuous basis to achieve compliance and protect against unauthorized discharge of contaminated water into the environment. The invention provides continuous water treatment capability to a large number of distributed filter systems (e.g., physically separate and, possibly, far apart from one another) at a cost that is many factors cheaper than the cost of a conventional sewer system. Where, in particular, all discharge is treated at an even more expensive regional wastewater treatment facility such as those operated by city and state governments.

Although the invention is illustrated and described herein as embodied in a multi-stage bioreactor for effluent denitrification and systems and methods for removing nitrogenous waste and odors from wastewater using multi-zone aerobic and/or anaerobic fluidized expansion chambers and in systems and processes for wastewater treatment, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 6 is a fragmentary, horizontal cross-sectional view of an injection base of the filtration system of FIG. 5 along section line 6-6 in FIGS. 7 and 8;

FIG. 7 is a fragmentary, vertical cross-sectional view, along section line 7,8-7,8 in FIG. 6, of the injection base of FIG. 6 and a flow regulation device of FIG. 5 with the float valve in an almost closed state;

FIG. 8 is a fragmentary, vertical cross-sectional view, along section line 7,8-7,8 in FIG. 6, of the injection base and flow regulation device of FIG. 7 with the float valve in an open state;

DETAILED DESCRIPTION OF THE INVENTION

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 5:
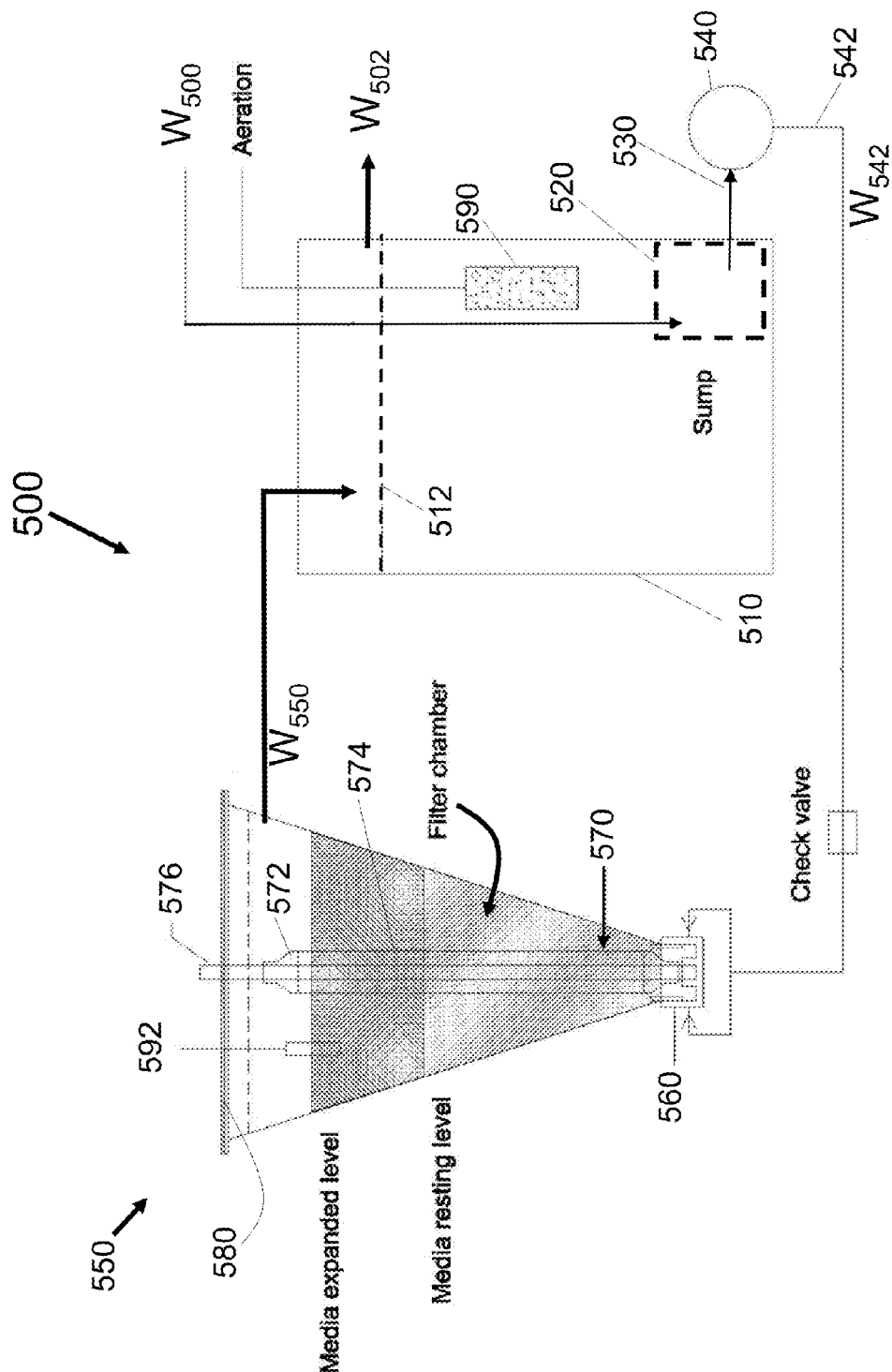
FIG. 5 is a vertical cross-sectional view and flow diagram of a filtration system according to one exemplary embodiment of the invention where the filter is separate from the sump.

Described now are exemplary embodiments of the present invention. Referring now to the figures of the drawings in detail and first, particularly to FIG. 5, there is shown a first exemplary embodiment of a denitrification system and process 500 according to the invention. This configuration of a sump and fluidized bed reactor is the same for both the anaerobic and aerobic stages with the exception of an aeration device used in the latter. FIG. 5, therefore, is an example of an aerobic stage because an aeration device 590 is present in the sump 510. With respect to the inventive features, however, they apply to both anaerobic and aerobic stages even though only the aerobic stage is illustrated here.

Incoming wastewater $W_{500}$ enters a filter sump 510 at a pump entry section 520. In the invention, this effluent $W_{500}$ is directed not into the sump 510 at any location therein but, rather, at a location adjacent a filter pump inflow conduit 530, this location is referred to herein as the pump entry section 520. The pump entry section 520 is defined only diagrammatically (with dashed lines) because it can be implemented in a variety of ways. In one exemplary embodiment, the pump entry section 520 can be two vertical walls extending upward from the bottom of the sump 510 at a bottom corner thereof to form an open-topped box. As long as the filter pump 540 is pumping at the same time the effluent $W_{500}$ is entering the sump 510, then virtually all of the effluent $W_{500}$ will be drawn into the pump 540 before exiting the open-topped box 520. Another exemplary configuration of the pump entry section 520 can be formed by a similar assembly of two corner walls to form a second open-topped box but these walls extend above the water level 512 of the sump 510. In such a configuration, therefore, all effluent $W_{500}$ is drawn into the pump 540—so long as the effluent $W_{500}$ does not overflow this open-topped box 520. If aeration of the fluid in an aerobic sump 510 is desired, it can be performed as shown in FIG. 5 by aerating the sump fluid outside the pump entry section 520.

Figure 3:
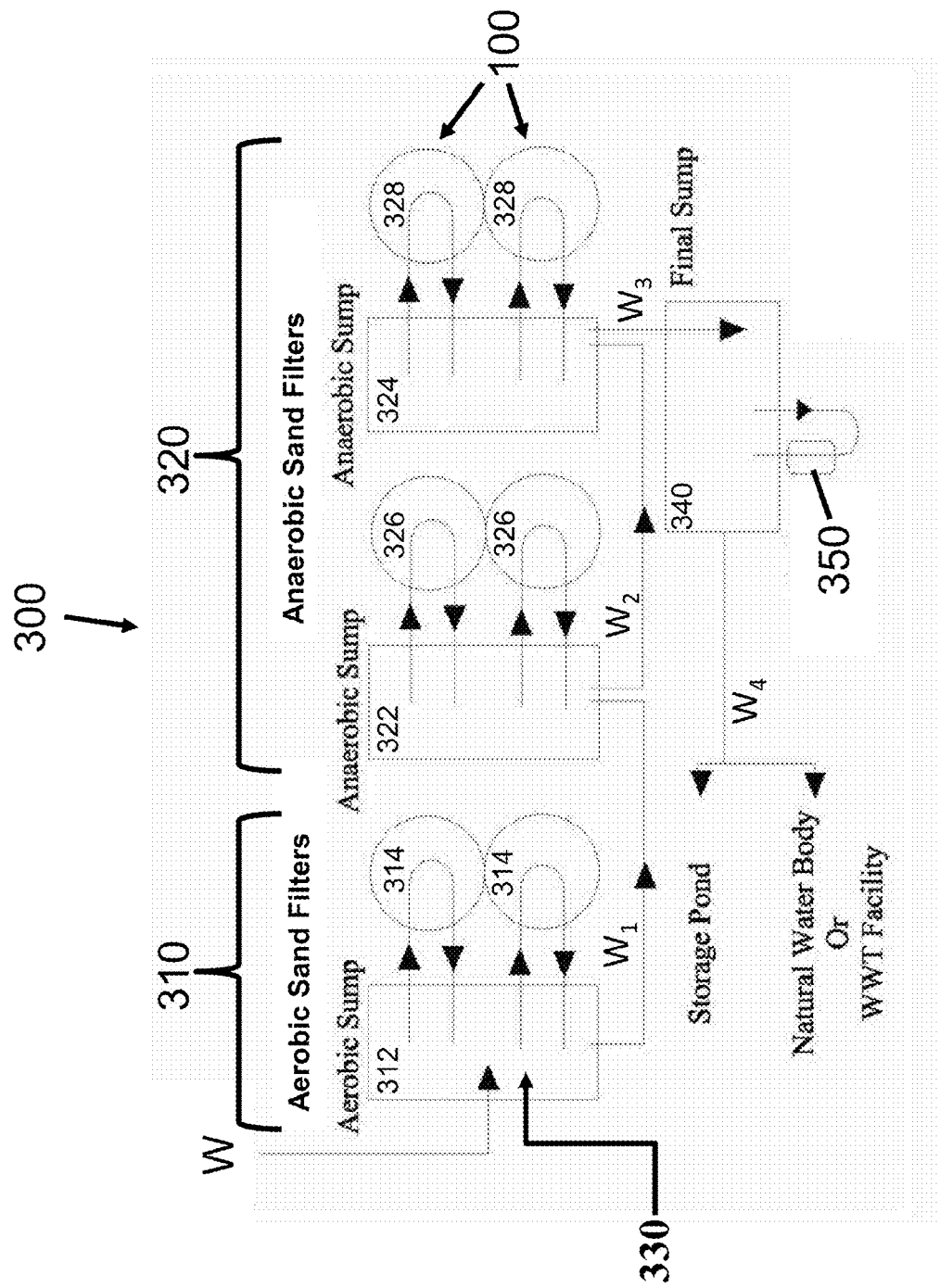
FIG. 3 is a diagrammatic plan view of a prior art denitrification system incorporating the fluidized bed reactor of FIG. 1.
Figure 4:
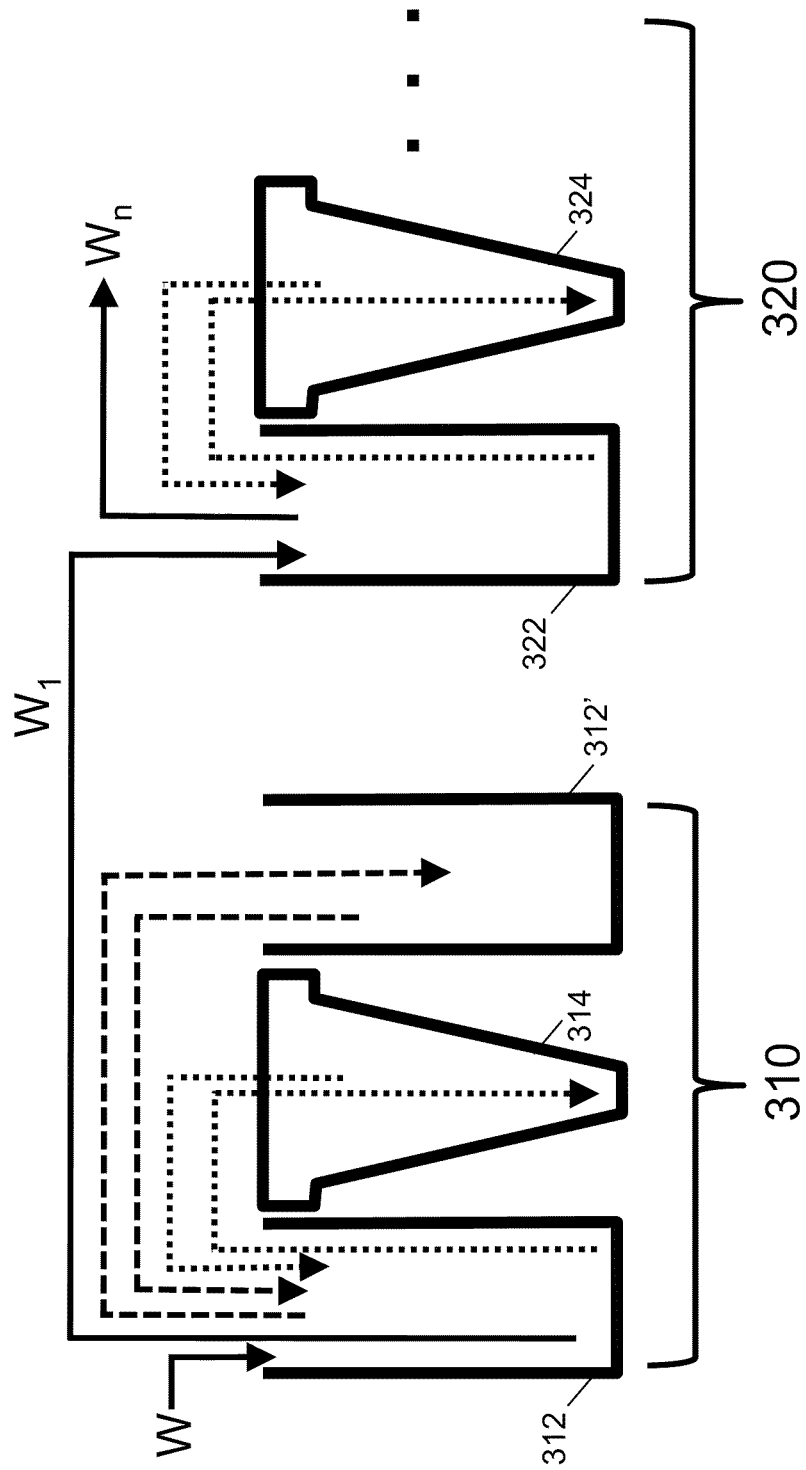
FIG. 4 is a liquid flow diagram of a portion of the denitrification system of FIG. 2.

Alternatively, or additionally, the sump fluid inside the pump entry section 520 can be aerated. (Aeration can even be performed outside the sump 510 when fluidically connected to the sump 510 by input and output conduits similar to the secondary removal system 350 configuration shown in FIG. 3. The pump 540 transfers fluid in the pump entry section 520 to the fluidized bed reactor 550 of the invention at its injection base 560.

Filtered fluid $W_{550}$ processed by the fluidized bed reactor 550 enters the sump 510 from the fluidized bed reactor 550. As this fluid $W_{550}$ is cleaner than the fluid contained in the sump 510, it can enter the sump 510 at or near the sump's water level 512. This fluid $W_{550}$ can also enter the sump 510 at any other level as desired. Treated water $W_{502}$ leaves the sump 510 from the water level 512 as the fluid highest in the sump 510 is taken as being most free from the wastewater constituent filtered out by the fluidized bed reactor 550. For removal of the treated water $W_{502}$, in one exemplary embodiment, the wall of the sump 510 can be provided with an output port acting as a drain and, thereby, define the highest point of the water level 512 (so long as the rate of incoming treated water $W_{502}$ does not exceed the rate of drain plus the rate of any incoming wastewater $W_{500}$ if it enters the sump 510 and not only the pump entry section 520). In another embodiment, a flexible outlet tube can be connected to a device floating at the top of the fluidized bed and act as a skimmer to draw off the uppermost layer of liquid in the sump 510. Such a tube can float on top of the water and, therefore, allow the water level 512 to vary as desired.

Figure 1:
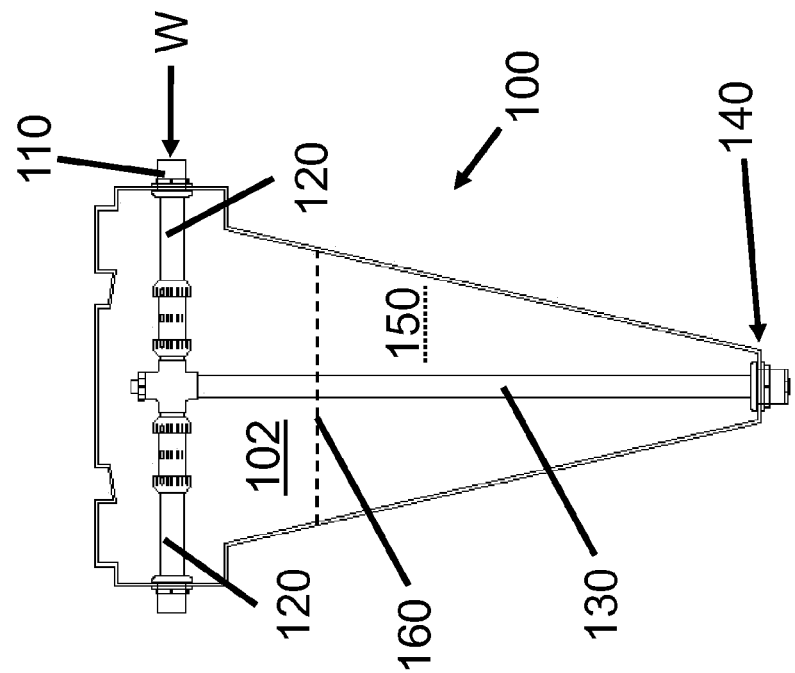
FIG. 1 is a vertical, partially cross-sectional view of a prior art fluidized bed reactor.
Figure 2:
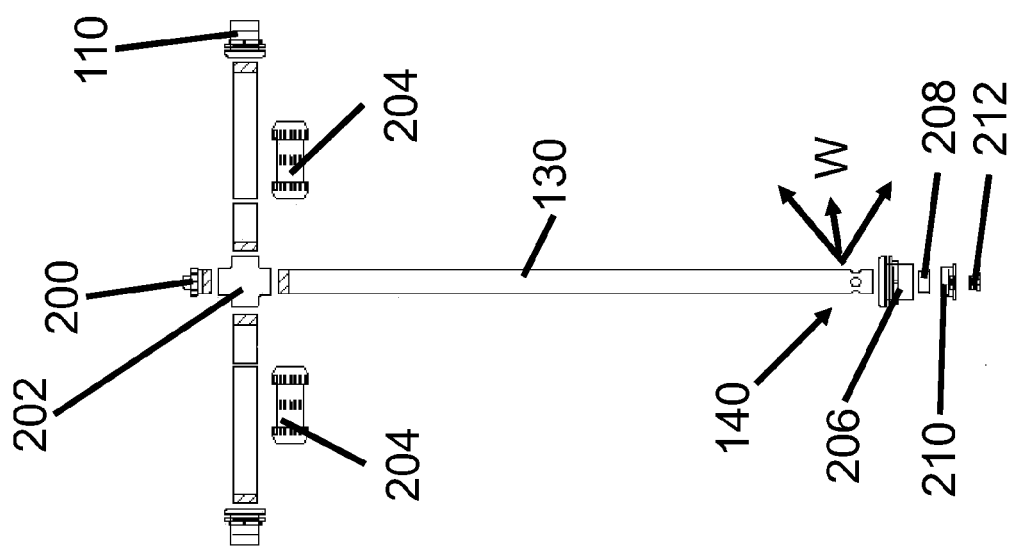
FIG. 2 is an exploded, side elevational view of plumbing parts of the fluidized bed reactor of FIG. 1.

The invention includes a novel injector assembly 560, 570 that provides the water to be filtered $W_{542}$ to the bottom of the fluidized bed reactor 550 in a special way. This injector assembly is comprised of an injection base 560 and a flow regulation device 570. The injector assembly 560, 570 can be best seen in FIGS. 6, 7, and 8. In contrast to the prior art fluid injection system 120, 130, 140 (shown in FIG. 1) that forces the effluent W downwardly into the bottom of the fluidized bed reactor 550 from above, the injector assembly 560, 570 of the invention provides the water to be filtered $W_{542}$ into the bottom of the fluidized bed reactor 550 differently. More specifically, and with particular reference to FIG. 6, the injection base 560 provides the water to be filtered $W_{542}$ horizontal with respect to the Earth and tangentially with respect to the central axes 662, 672 of both the injection base 560 and the flow regulation device 570. FIG. 6 shows a cross-section of the injection base 560 along plane 6-6 shown in FIGS. 7 and 8. Multiple injection ports 664 are connected fluidically to the pump output 542 to receive the water to be filtered $W_{542}$ therethrough. As shown by the arrows 660, the water to be filtered $W_{542}$ enters the mixing chamber 766 of the injection base 560 substantially horizontally and in a straight line. Then, as it passes a point (e.g., a mid-point, here, the cross-sectional line 7,8-7,8), the flow is caused to spiral around the central axes 662, 672 and form a liquid cyclone or vortex. Having nowhere downward to go, the injected liquid spirals upwards in the mixing chamber 766 and into the interior chamber 652 of the fluidized bed reactor's body 750 where the filter media is present.

The novel water injector of FIGS. 6, 7, and 8 has significant advantages over the prior art. First, the new system provides three pathways for injecting fluid into the base of the filter as compared to the prior art system, which had only one. This is important if the water supply line became occluded due to a power failure, for example. Multiple inlets provide redundancy and security for restarting the fluidization. Next, in contrast to the prior art, the center inlet tube can also be used to supply wastewater (saturated with oxygen) straight to the base of the filter for maximum filtration effectiveness. The novel injector also is more robust and offers more mounting/plumbing options. The novel injector housing allows for modification to the center tube, thus allowing individual systems to be "custom tailored" to a specific system (different flow rates, media size, media density, etc.). Finally, multiple inlets in the base also allow for multiple supply pumps if such a configuration is desirable.

A watertight connection between the body 750 of the fluidized bed reactor 550 and the injection base 560 is created in this exemplary embodiment by a hollow lower tube 752 of the body 750 fitting snugly within an upper cavity 668 of the injection base 560.

As the vortex moves upwards, it presses against a lower plug 770 of the flow regulation device 570 at a lower expansion surface 772. Here, the lower expansion surface 772 has an annular shape increasing in diameter from bottom to top in the fluid movement direction (i.e., vertically upwards in the orientation shown in FIGS. 7 and 8). Of course, this shape can be changed as desired, for example, an inverted pear shape produces a slightly different result. This shape is not required to increase in diameter from inside to outside. Other shapes are possible.

Figure 10:
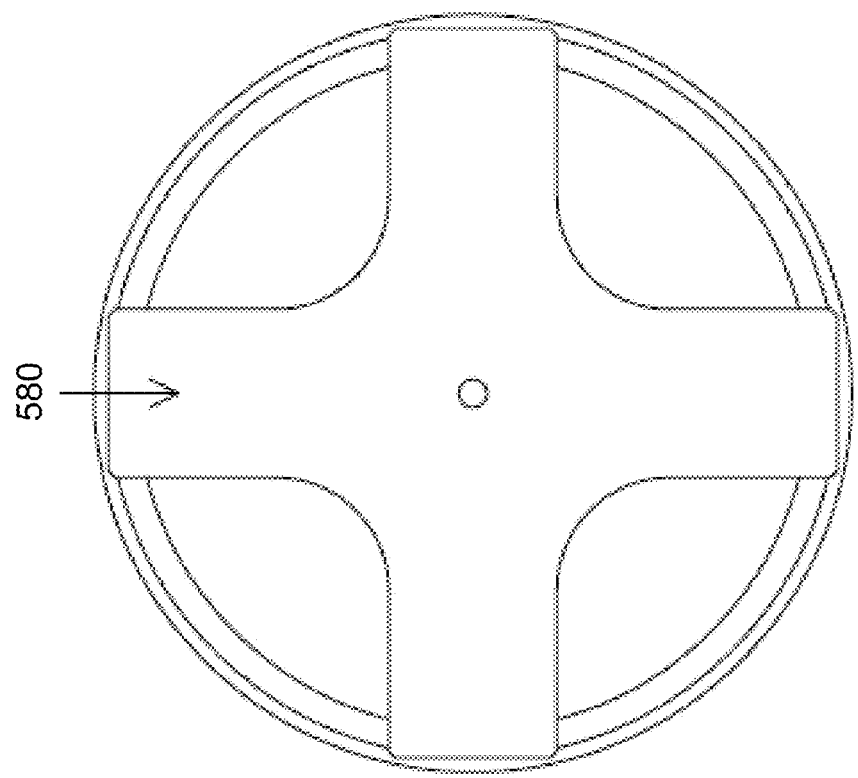
FIG. 10 is a plan view of an alternative exemplary embodiment of a support plate of the flow regulation device of FIG. 5.

The flow regulation device 570 is shown only partially in FIGS. 7 and 8 but in its entirety in FIG. 5. This exemplary embodiment of the flow regulation device 570 is made up of the lower plug 770, an upper collar 572, a hollow body 574 connected to both the lower plug 770 and the upper collar 572, and a central support tube 576 about which the lower plug 770 and the upper collar 572 are slidably disposed. The central support tube 576 fits into a socket 669 in the center of the injection base 560 and terminates, as shown in FIG. 5, above the body 750 of the fluidized bed reactor 550. A support plate 580 supports the central support tube 576 at the top of the fluidized bed reactor 550. The support plate 580 can be simply a strip of material spanning the entirety of the upper diameter of fluidized bed reactor 550 and having a hole in the center allowing the central support tube 576 to protrude therethrough. Alternatively, the support plate 580 can have the same central hole to fit the central support tube 576 therein but also be disk-shaped to cover the entire top opening of the body 750, thus preventing any contaminant in the environment from entering the top of the fluidized bed reactor 550. This upper and lower connection stabilizes the central support tube 576 and the entire float assembly 560, 570 within the fluidized bed reactor 550. The support plate 580 serves to center and support the air injection/support tube 576, to center and support the cone of the filter, and to allow over-flow water to return to the sump 510. An alternative embodiment of the support plate 580 is shown in FIG. 10.

With the connected assembly of the upper collar 572, the hollow body 574, and the lower plug 770 sliding about and along (vertically) the central support tube 576, these figures illustrate how the injection base 560 and the flow regulation device 570 cooperate to divert the flow upwards towards the sides of the fluidized bed reactor 550 and simultaneously have the flow regulation device 570 act as a float or check valve of the fluidized bed reactor 550. More specifically shown by the transition from FIG. 7 to FIG. 8, the flow regulation device 570 lifts up from the force of the water, or, alternatively, is adjusted to a fixed position, thus diverting towards the sides of the interior chamber 652. The flow regulation device 570 falls back down when such flow is interrupted. This lift creates a flow gap 700 between the lower expansion surface 674 and the uppermost portion of the interior walls 710 of the injection base 560. As such, when pressure exists in the mixing chamber 766, as shown in FIG. 8, the gap 700 is open and large, thus permitting liquid to flow into the filter media, the pressure of the liquid preventing filter media from entirely filling and, thereby clogging, the internal mixing chamber 766. Conversely, when pressure in the mixing chamber 766 is reduced or eliminated, before the filter media has a chance to enter the mixing chamber 766, the lower plug 770 completely enters the mixing chamber 766 (slightly lower in the mixing chamber 766 than shown in FIG. 7) to close the gap 700. When so closed, the lower plug 770 prevents filter media from settling into the internal mixing chamber 766 and plugging up the fluidized bed reactor 550. While the pressure of liquid entering the mixing chamber 766 may be sufficient to lift the float valve, the annulus between the central support tube 576 and the hollow body 574 can be filled with air and/or water to adjust buoyancy of the flow regulation device 570 either positively or negatively.

In an addition to the embodiment illustrated in FIGS. 5 and 7, the central support tube 576 (as well as the lower plug 770) can be fitted at the bottom with one or more outlets 800 (shown diagrammatically with dashed lines in FIG. 8) and at the top with a fluid supply to, for example, supply oxygen, air, water, or another fluid under pressure inside the interior mixing chamber 766. If desired, water can be injected into the central support tube 576 to clear material or filter media that somehow has bypassed the float valve and clogged the interior mixing chamber 766. This unclogging is referred to as "burping" the filter. While these outlets 800 are shown as discrete openings, the portion of the central support tube 576 where the openings 800 are shown can, instead, contain a porous material that would allow air or water to flow into the fluidized bed but prevent sand from clogging the openings.

Positioned anywhere inside the fluidized bed reactor 550 can be various sensors. One such sensor 592 (an oxygen probe for example) is shown as hanging from the support plate 580 and within the fluidized bed of filter media. Such sensors can measure temperature, dissolved solids, pH, dissolved oxygen, or other filter characteristic. If desired, data from such sensors can be used to adjust process parameters and, for example, be managed by microprocessor control. In the embodiment of FIG. 5, the fluidized bed reactor 550 is separate from the sump 510. This configuration still has the relatively large footprint described above. In an alternative embodiment of the invention shown in FIG. 9, in contrast, the inventive filtration system 900 places the fluidized bed reactor 910 actually inside the sump 920.

Mounting the fluidized bed reactor 910 in the sump offers several distinct advantages over mounting it externally. First, it eliminates expensive and complex support structure required for a conical tank. Second, placing the fluidized bed reactor 910 inside a sump offers outstanding mounting stability and protects the filter from being accidentally knocked over. Next, the fluidized bed reactor 910 has far better temperature stability since the fluidized bed reactor 910 is insulated by the water in the sump. Also, there is less thermal loss from a second external structure and its related plumbing. Fourth, the footprint of the entire system is greatly reduced (by about 40-50 percent). A fifth advantage is a significant reduction in the likelihood of a spill because all of the related plumbing of the fluidized bed reactor 910 is contained in the sump. Finally, such a configuration simplifies construction and shipping, which is not insignificant for a large filter system.

The injector assembly of this embodiment also is comprised of the same injection base 560 and flow regulation device 570 of the injector assembly of FIG. 5. As such, this injector assembly receives wastewater to be treated $W_{900}$ from a pump 940 through a pump output 942. This pump output 942 provides the water to be filtered $W_{942}$ into the bottom of the fluidized bed reactor 910 horizontal with respect to the Earth and tangentially with respect to the central axis of both the injection base 560 and the flow regulation device 570. This exemplary embodiment of the flow regulation device 570 also includes the lower plug 770, the upper collar 572, the hollow body 574 connected to both the lower plug 770 and the upper collar 572, and the central support tube 576 about which the lower plug 770 and the upper collar 572 are slidably disposed.

Figure 9:
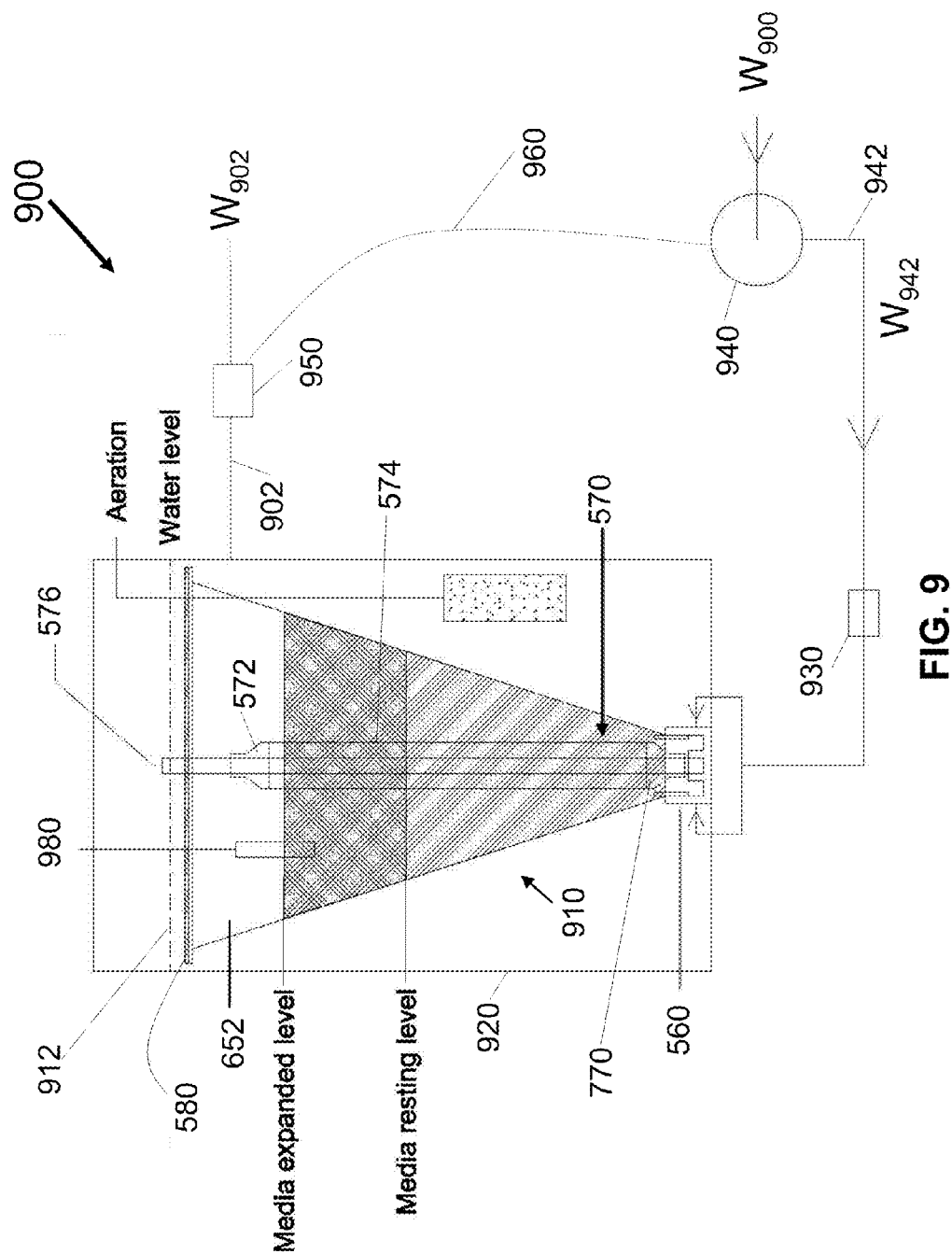
FIG. 9 is a vertical cross-sectional view and flow diagram of a filtration system according to another exemplary embodiment of the invention where the filter is within the sump.

As the configuration and operation of the injection base 560 and the flow regulation device 770 in FIG. 9 are the same as already described above, the features thereof are not explained again. The support plate 580 also functions similarly to support the central support tube 576 at the top of the fluidized bed reactor 910. With the connected assembly of the upper collar 572, the hollow body 574, and the lower plug 770 sliding about and along (vertically) the central support tube 576, FIG. 9 illustrates how the injection base 560 and the flow regulation device 570 cooperate to divert the flow upwards towards the sides of the fluidized bed reactor 910 and simultaneously have the flow regulation device 570 act as a float or check valve of the fluidized bed reactor 910.

The embodiment of FIG. 9, however, differs with respect to the water level 912. Here, overflow of the fluidized bed reactor 910 always enters the sump 920—because the fluidized bed reactor 910 exists inside the sump 920. Accordingly, the water level 912 (shown with a dashed line) can be above the support plate 580.

There are significant and varied benefits by locating the fluidized bed reactor 910 inside the sump 920. First, as mentioned above, the footprint of the filtration stage reduces by half. Second, for example, the support plate 580 (or some other support at the upper end of the fluidized bed reactor 910) can be fixed to the inside of the opposing walls of the sump 920. With the injection base 560 also secured to the floor of the sump 920, the sump 920, itself, becomes the support structure for the fluidized bed reactor 910, thereby eliminating all of the expensive parts and assembly costs for the separate support structure required by the prior art and by the reactor configuration shown in FIG. 5. This savings of cost and materials is not insignificant. Next, the water surrounding the entire fluidized bed reactor 910 provides stability and support to the entire outer surface of the fluidized bed reactor 910. The water also serves to insulate the fluidized bed and stabilize temperature variations.

In an addition to the embodiment illustrated in FIG. 9, the central support tube 576 (as well as the lower plug 770) can be fitted at the bottom with one or more outlets 800 (like the ones shown diagrammatically with dashed lines in FIG. 8) and at the top with a fluid supply to, for example, supply oxygen, air, water, or another fluid under pressure inside the interior mixing chamber 766. If desired, water can be injected into the central support tube 576 to clear material or filter media that somehow has bypassed the float valve and clogged the interior mixing chamber 766. In addition to or instead of injecting fluid through the central support tube 576, oxygen or air can be injected downstream of check valve 930, into one or both of the injection ports 664 of the injection base 560, or into the mixing chamber 766. This injection can be used to alter the filtration process, for cleaning clogs, and/or for reestablishing fluidization (burp), to name a few.

If the pump 940 is the only measure for injecting effluent into the filtration system 900, then too much flow will cause the sump 920 to overflow, even if the treated water $W_{902}$ leaving the sump 920 is allowed to freely flow out through a skimmer tube 902 in the side wall of the sump 920. If desired, therefore, a flowmeter 950 can reside at the skimmer tube 902 and, through a communication device 960, provide information to the pump 940 in a feedback loop to regulate pump 940 activity. Such feedback can occur by a direct connection, wirelessly, or indirectly through a separate control system, such as a microcomputer connected to the Internet, for example.

Like the embodiment of FIG. 5, positioned anywhere inside the fluidized bed reactor 910 or the sump 920 can be various sensors. One such sensor 980, e.g., an oxygen probe, is shown as hanging from the support plate 580 and within the fluidized bed of filter media inside the fluidized bed reactor 910. Such sensors can measure temperature, dissolved solids, pH, oxygen, or other filter characteristics. If desired, data from such sensors can be used to adjust process parameters and, for example, be managed by microprocessor control. Examples of these alternatives are described in further detail below.

Various process characteristics of filtration according to the invention can be described with respect to FIGS. 5 to 8. The process of removing nitrogenous waste (such as ammonia, nitrite, and/or nitrate) and odors from wastewater using multi-zone aerobic, anaerobic (or both) fluidized expansion chambers first has incoming wastewater $W_{500}$ enter the sump 510 from external non-illustrated pump(s), siphon tube(s), overflow barrier(s) or gravitational flow, to name a few. The sump 510 acts as an "accumulator" for the wastewater $W_{500}$ being filtered, thus insuring the attached biological filter's supply pump 540 always has a steady supply of water for consistent media fluidization. If the sump 510 is oversized, it will contain water during high flow events and allow it to be properly processed by the filter system 500 over longer periods of time, i.e., there is no wash out. The turnover rate into the sump 510 partially dictates the dwell time for the water being treated. A slower intake flow allows the wastewater to be more thoroughly processed by the filtration system 500 as more wastewater passes through the media. Even under conditions of no flow, the filtration system 500 remains active and fluidized. This is significant when dealing with batch flow or fluctuating wastewater flows. The water being treated is ideally kept at a temperature of between 40 and 100 degrees Fahrenheit, at a pH of between 5 and 8, at oxygen levels greater than 2.0 mg/l for aerobic filtration and less than 1.0 mg/l for anaerobic filtration. Oxygen probes mounted or suspended in the media allows aeration to be properly set for the desired form of filtration. Oxygen can be added (if needed) to the wastewater in the sump 510. Other probes to detect temperature, pH, etc. can be used as well. Water $W_{542}$ enters the fluidized bed reactor 550 at the bottom center. The flow rate can be highly variable, but there should be enough water entering the chamber 652 to cause the resting media to become continuously "fluidized or expanded" above the resting level. But, the flow rate should not be fast enough to wash the media out of the fluidized bed reactor 550. "Pulsing" the inlet flow rate (periodically) above normal operation levels is helpful in insuring that the media does not have a chance to form "dead zones" where the media can de-fluidize and clump. The biological chamber 652 in the fluidized bed reactor 550 is a multi-zone, multi-diameter vessel that can be either an open-topped or pressurized container, depending upon the given circumstances. Progressively increasing the fluidized bed reactor's diameter drastically lengthens the "dwell time" of water being treated therein, allowing the water to be in contact with the bacteria for far longer periods of time than it would be in a cylinder of similar height. Depending upon the shape and flow rate, this can be an order of magnitude (or more) of additional exposure time to the media. The diameter increase also helps prevent media loss by decreasing the water velocity through the internal chamber 652. The solid media in the fluidized portion of the fluidized bed reactor 550 needs to have negative buoyancy and to be relatively uniform in classification. Fixed media can also be installed in the top portion of the biofilter (above the fluidized media) to provide additional bacterial attachment points.

Another exemplary embodiment of the filter housing differs from a straight-sided cone. In such an embodiment, the walls can have a variable sweep (like a soda-bottle shape, for example). A variable sweep to the sidewalls allows the flow dynamics to be optimized for different media types and applications. Also, the filter chamber 652 can be built either as pressurized systems (water enters and leaves the filter under pressure) or as non-pressurized systems (water enters under pressure but drains from sump under gravity). Both types have individual applications and benefits. There also is a benefit to coupling fluidized bed reactors with anaerobic digesters. The anaerobic digesters mineralize additional nitrogen in the process of converting organic matter in the waste to methane. The additional mineralized nitrogen becomes available for removal from the wastewater and the methane from the anaerobic digester can be used to produce energy. If the final effluent is desired to be used as a fertilizer, then the fluidized bed reactor can be configured to convert ammonia nitrogen to nitrate but without the final conversion of the nitrate to atmospheric nitrogen ($N_2$). By doing this, the volatility of the nitrogen is reduced and less of the fertilizer value of the effluent will be lost during application of the effluent to the crops being fertilized. It is noted that nitrate is a preferred form of nitrogen for most crops.

What has been primarily described above are systems and processes for treatment of wastewater in a context independent from the overall environment, such as a singular facility. It has been discovered that the above systems/processes are not simply for stand-alone applications independent of the environment or other facilities. Rather, a single facility can be interconnected to a remote location for external control and monitoring. In this way, not only can the facility be operated to insure that no wastewater is discharged into the environment in a "micro" perspective, but the guarantee of non-discharge can be documented automatically with verifiable systems and reliable devices. Interconnection of a number of different systems in the environment or to other systems/processes provides enhanced benefits. More particularly, the invention is able to coordinate a particular wastewater system of the invention with other, separate wastewater systems so that an entire area (such as all wastewater systems along a particular waterway, for example) can be monitored and documented; this being referred to as a "macro" perspective of wastewater processing and control. Before describing the macro-system embodiment, an exemplary micro-process is described with regard to FIG. 11—"micro" referring to a singular bioreactor in this example and "macro" referring to the bioreactor combined with its surroundings and interconnections and its affect on the environment and other wastewater treatment facilities. To place the systems and processes of the invention in context, an exemplary embodiment is explained with regard to treatment of wastewater that would be generated from a dairy farm or other livestock-using industry location. In addition to treating wastewaters from confined animal feeding operations, the inventive fluidized bed reactor can be used to treat other wastewater streams including aquaculture, pond and lake maintenance, food processing, brewery and other fermentation and distillation processes, municipal and residential wastewaters, and other industrial wastewaters that require the removal of odors and nitrogen compounds.

In general, generated waste is collected in various ways, either through toilets or, in the dairy farm example, by washing manure off of the floor of a dairy barn. Though washing with water is an effective way of clearing the manure from the barn floor, the water then has to be treated/disposed of in some way. This flush water can be fresh water, which has a negative affect on the environment, or, according to an exemplary embodiment of the invention, the flush water can be recycled water processed from the wastewater treatment system of the invention itself.

Figure 11:
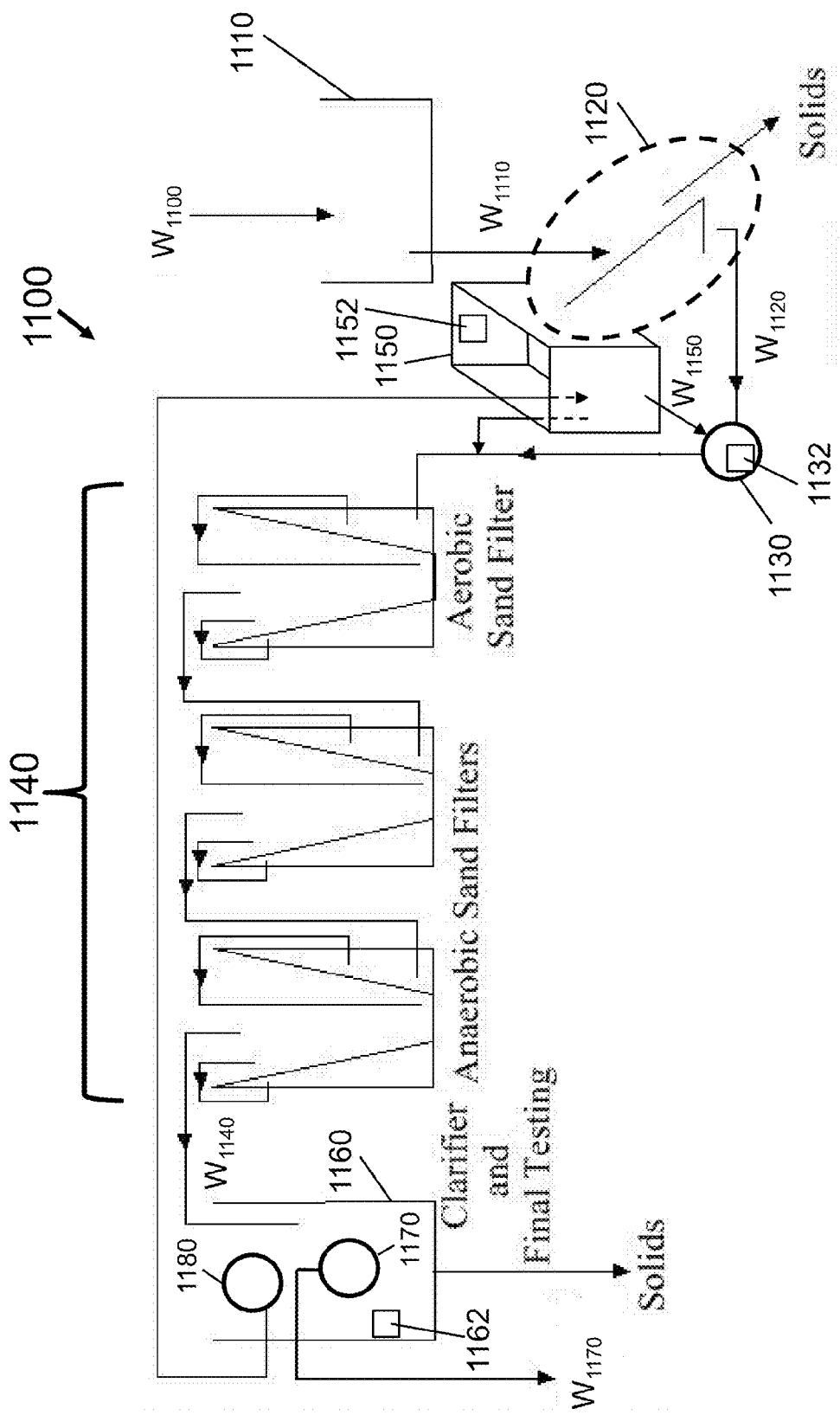
FIG. 11 is a diagrammatic flow diagram of a wastewater treatment system according to an exemplary embodiment the invention.

With regard to FIG. 11, the wash-off manure-water mixture $W_{1100}$ is collected in a holding facility or tank 1110. The manure-containing water $W_{1100}$ is diverted to a solids separator 1120 (diagrammatically indicated by a dashed line) and the solids are removed for use as a soil amendment or bedding, for example. A pump 1130 injects the solids-free water $W_{1120}$ into the sump of a first stage of a bioreactor 1140 according to the invention. Here, the bioreactor 1140 is shown with one aerobic and two anaerobic filter stages, in particular, sand filters. This exemplary configuration also employs the low-footprint filter configuration of the invention shown in FIG. 9. This configuration is only exemplary and can be expanded in any configuration as desired or as described herein. The water pump 1130 for pumping solids-free water has two inputs, the first solids-free water $W_{1120}$ arrives from the output of the solids separator 1120, and the second $W_{1150}$ arrives from an output of a pre-filter sump 1150, which is described in further detail below.

After passing through an aerobic filtration stage and at least one anaerobic filtration stage (typically two or more), the filtered water W1140 enters a post-filter holding sump 1160, which can be a lagoon or any other holding area that contains the filtered water W 1140 and prevents it from being discharged into the environment in any way, even when the system 1100 is not functioning or when the sump 1160 experiences a sudden influx, whether of fresh water, of wastewater, or of any other contamination. In this way, the water W1140 in the post-filter sump 1160 can be monitored at all times to determine if the quality of the water W1140 is at or below permissible discharge levels. The post-filter sump 1160 being large enough to handle any output volume of the bioreactor 1140 allows the system 1100 of the invention to control very precisely what is discharged. To insure that only verified effluent is discharged out from the system, only when the contents of the post-filter sump 1160 is measured as "pollutant-free" (according to desired standards that can vary from system to system) will the output pump 1170 be allowed to remove water therefrom and transfer "clean" water W1170 into the environment, which could be a sewer system, cropland, or a local waterway, to name a few. If, in contrast, the water W1140 in the post-filter sump 1160 has an unacceptable level of contamination, then a recirculation pump 1180 transfers the water W1140 from the post-filter sump 1160 back into the pre-filter sump 1150 for reprocessing in the biofilter 1140.

Sensor suites can be located at various locations in the inventive system. As used herein, a "sensor suite" can be one or more sensors, each measuring or detecting at least one characteristic of the water, the associated physical structure, the associated local environment of the structure, and/or the machinery associated with the structure. According to an exemplary embodiment, the water pump 1130 has a first sensor suite 1132, the pre-filter sump 1150 has a second sensor suite 1152, and the post-filter sump 1160 has a third sensor suite 1162. Of course, additional or alternative sensor suites can be located at any part or stage of the systems and processes of the invention. "First," "second," and "third" is not used here to describe a temporal association of the components or a physical association of the components; these labels are only used as identifiers to separate the understanding of the various sensor suites from one another. In one embodiment, for example, the three sensor suites 1132, 1152, and 1162 can be a single system with various parts and functions.

Exemplary sensors can include alarms, for example, visual (e.g., lights), aural (e.g., speakers), and/or communicative (e.g., an email or any electronic signal). The alarm signals can be sent directly, as in a monitoring booth at the location, or indirectly, e.g., transmitted through the Internet to a remote and/or automated site. Cameras can also be used as sensors. A camera can include a microphone when noise conditions are desired to be monitored. Water detection sensors can monitor water spills at any part of the systems/processes. With any of these sensors, it is beneficial to log data measured by each sensor so that past status can be verified and, possibly, future problems predicted. Data can be logged by local analog machines (e.g., paper and pen cylinders) or digital machines (e.g., electronic signals corresponding to current states) can transmit or store the data.

Parameters of the water including temperature, pH, oxygen ($O_2$) content, oxidation/reduction (ReDox), ammonia ($NH_3$), Nitrate ($NO_3$), flow (both presence and rate), total suspended solids (TSS), and fluidized bed level/height can each be measured with respective sensors. An example of a data table that can be kept by a respective sensor suite 1132, 1152, 1162 or set of sensor suites is set forth in the following table.

|  | 1132 | 1152 | 1162 |
| --- | --- | --- | --- |
| Temp | $T_1$ | $T_2$ | $T_3$ |
| pH | $pH_1$ | $pH_2$ | $pH_3$ |
| $O_2$ | $Ox_1$ | $Ox_2$ | $Ox_3$ |
| ReDox | $eH_1$ | $eH_2$ | $eH_3$ |
| $NH_3$ | $NH_1$ | $NH_2$ | $NH_3$ |
| $NO_3$ | $NO_1$ | $NO_2$ | $NO_3$ |
| Flow (y/n) | y/n | y/n | y/n |
| Flow (gpm) | $F_1$ | $F_2$ | $F_3$ |
| TSS | $TS_1$ | $TS_2$ | $TS_3$ |
| Bed Height | $BH_1$ | $BH_2$ | $BH_3$ |

As described above, many water treatment systems do not have the capacity to handle large surges of wastewater. As a result these systems routinely discharge polluted water because output water is discharged at the same rate it enters the system—when input flow exceeds processing capabilities of the system, the polluted water simply exits the system. The configuration of the inventive system 1100 described with regard to FIG. 11, eliminates this disadvantageous inability to process surges by sizing the holding tank 1110, the post-filter sump 1160, and the pre-filter sump 1150 sufficiently large enough to handle any surge that the system 1100 might experience. If the sensor 1132, 1152, and 1162 can monitor any or all of process flows, containment water levels, water temperatures, pH, nutrient concentrations, total suspended solids, actual and potential effects of local weather conditions, and others, then appropriate valves, pumps, and diverters can be actuated automatically to prevent any contaminated effluent from being discharged.

On a local site level, parameters that are measured by various probes and instruments connect to a central monitoring system (e.g., a personal computer), which contains and executes software that captures, processes, and records the sensed data and, then, remotely operates a number of responsive process control mechanisms such as valves, pumps, chemical dispensers, etc., to optimize the operation of a particular filtering system or to shut down one or more components or operations in the case of failure or need for repair. During times when the processed output exceeds the limits permitted for lawful or proper discharge (for example, the amount allowable under a particular permit), the invention can proactively divert output flow into a holding facility (i.e., tank or pond or sump) for reprocessing until concentration levels at the wastewater system output achieve compliance, at which time permissible discharge can occur. This "smart" interactive process is capable of monitoring and reporting on a local or regional basis (by coordinating the monitoring of adjacent sites or sites on the same waterway) and in real-time, allowing numerous advantages in monitoring the actual and potential discharges into a natural system, not the least of which is to allow affected dischargers to trade, sell or exchange excess capacity or allowances.

Figure 12:
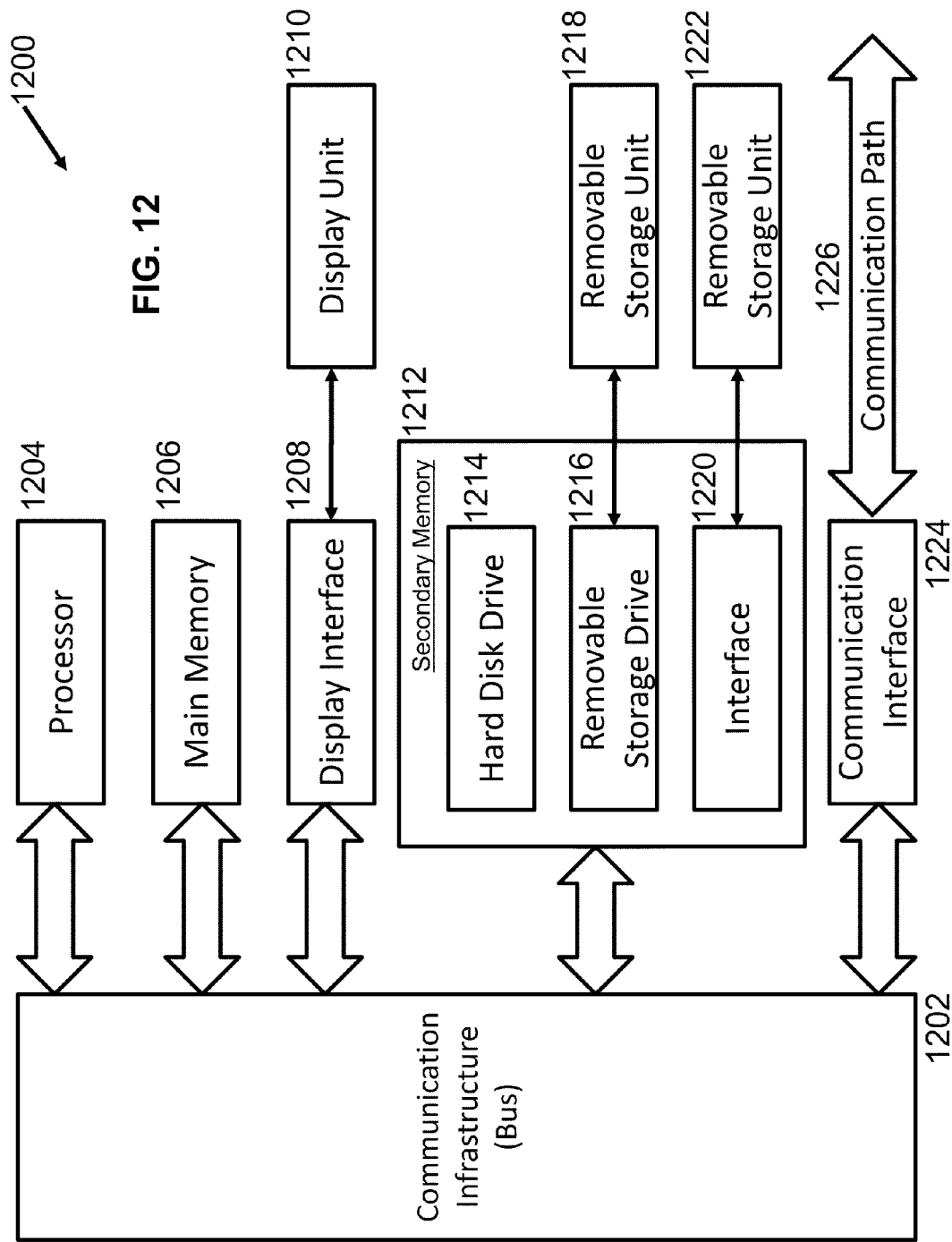
FIG. 12 is a block circuit diagram illustrating a computing system for implementing the central monitoring system according to an exemplary embodiment of the present invention.

FIG. 12 is a high-level, block diagram illustrating a detailed view of a computing system 1200 useful for implementing the central monitoring system according to embodiments of the present invention. The computing system 1200 is based upon a suitably configured processing device adapted to implement an exemplary embodiment of the present invention. For example, a personal computer, workstation, or the like, may be used.

In one exemplary embodiment of the present invention, the computing system 1200 includes one or more processors, such as processor 1204. The processor 1204 is connected to a communication infrastructure 1202 (e.g., a communications bus, crossover bar, or network). The computing system 1200 can include a display interface 1208 that forwards graphics, text, and other data from the communication infrastructure 1202 (or from a frame buffer) for display on a display unit 1210. The computing system 1200 also includes a main memory 1206, preferably random access memory (RAM), and may also include a secondary memory 1212 as well as various caches and auxiliary memory as are normally found in computer systems. The secondary memory 1212 may include, for example, a hard disk drive 1214 and/or a removable storage drive 1216, representing a floppy disk drive, a magnetic tape drive, an optical disk drive, etc. The removable storage drive 1216 reads from and/or writes to a removable storage unit 1218 in a manner well known to those having ordinary skill in the art. Removable storage unit 1218, represents a floppy disk, a compact disc, magnetic tape, optical disk, etc. which is read by and written to by removable storage drive 1216. As will be appreciated, components of the computing system 1200 (e.g., the main memory 1206 and/or the removable storage unit 1218) includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer-readable information.

In alternative embodiments, the secondary memory 1212 may include other similar measures for allowing computer programs or other instructions to be loaded into the central monitoring system of the invention. Such measures may include, for example, a removable storage unit 1222 and an interface 1220. Examples of such may include a program cartridge and cartridge interface (such as that found in video game devices), a removable memory chip (such as an EPROM, or PROM) and associated socket, and other removable storage units 1222 and interfaces 1220 that allow software and data to be transferred from the removable storage unit 1222 to the computing system 1200.

The computing system 1200, in this example, includes a communications interface 1224 that acts as an input and output and allows software and data to be transferred between the central monitoring system of the invention and external devices or access points via a communications path 1226. Examples of communications interface 1224 may include a modem, a network interface (such as an Ethernet card), a communications port, a PCMCIA slot and card, etc. Software and data transferred through communications interface 1224 are in the form of signals that may be, for example, electronic, electromagnetic, optical, or other signals capable of being received by communications interface 1224. The signals are provided to communications interface 1224 through a communications path (i.e., channel) 1226. The channel 1226 carries signals and may be implemented using wire or cable, fiber optics, a phone line, a cellular phone link, an RF link, and/or other communications channels.

Herein, the terms "computer program medium," "computer usable medium," and "computer readable medium" are used to generally refer to media such as main memory 1206 and secondary memory 1212, removable storage drive 1216, a hard disk installed in hard disk drive 1214, and signals. The computer program products are measures for providing software to the computer system. The computer readable medium allows the computer system to read data, instructions, messages or message packets, and other computer readable information from the computer readable medium.

Computer programs (also called computer control logic) are stored in main memory 1206 and/or secondary memory 1212. Computer programs may also be received through communications interface 1224. Such computer programs, when executed, enable the computer system to perform the features of the present invention as discussed herein. In particular, the computer programs, when executed, enable the processor 1204 to perform the features of the computer system.

Figure 13:
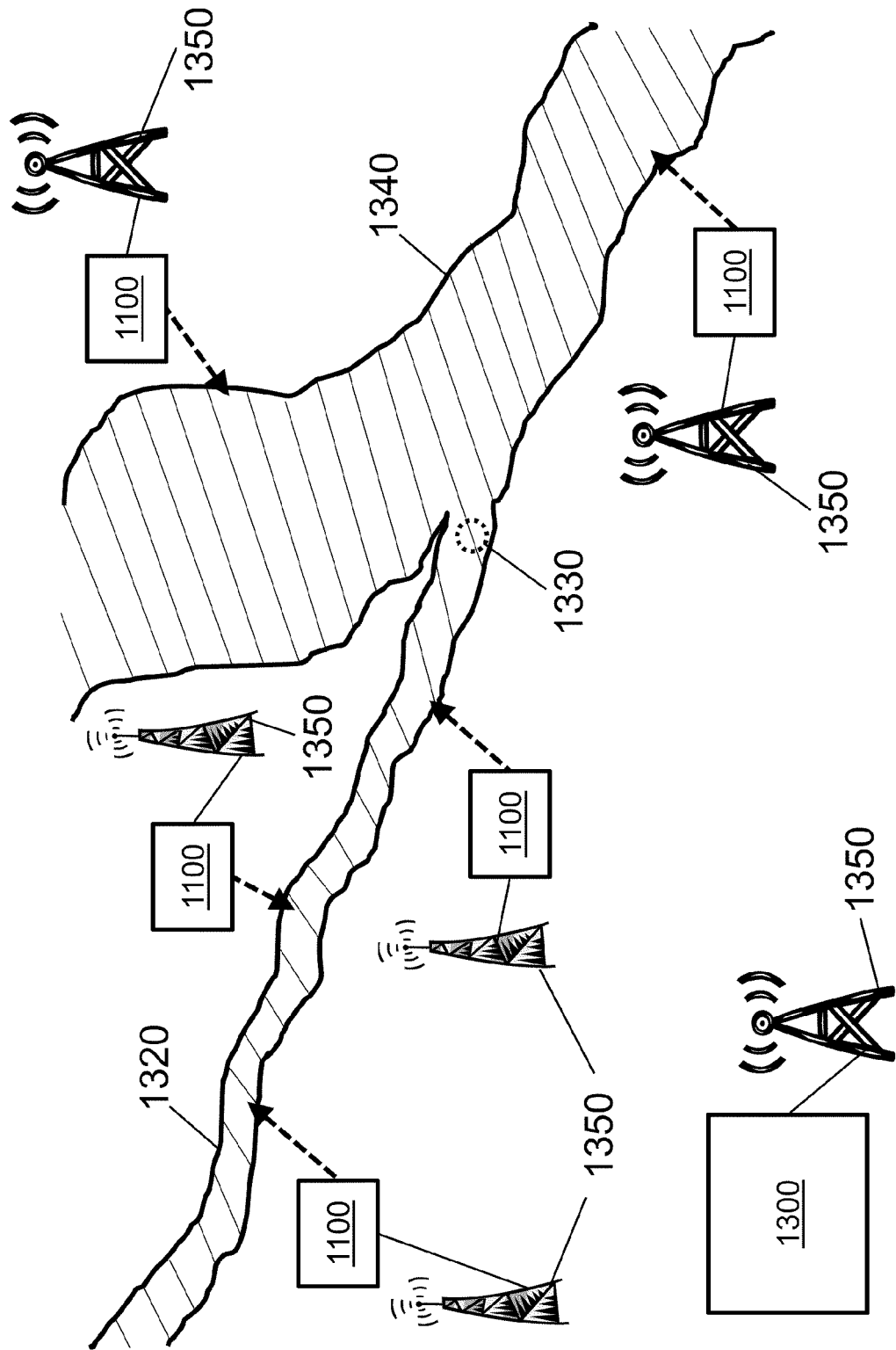
FIG. 13 diagrammatically illustrates an exemplary configuration of networked filter systems according to the invention along an exemplary aquifer.

Each of the inventive filtration systems has the ability to connect through the Internet or through other remote electronic measures to a central monitoring location, where operational parameters and maintenance of the systems can be observed and controlled. The monitoring location is able to view the data recorded by each filtration system (either periodically or in real-time), and, in an embodiment where a remote viewing system is used in conjunction (for example, a web camera), operational problems are observed and diagnosed remotely. If any problems occur that need physical repair or service, a live technician can, then, be dispatched to fix the filter system or that filter system could be shut down remotely or have its output diverted remotely or held until proper operation of the filter was restored. With the inventive connection of various dispersed filter systems, undesired diversion of wastewater into the aquifer is entirely prevented. FIG. 13 diagrammatically illustrates an exemplary configuration of networked filter systems according to the invention along a particular aquifer.

In the macro-system of the invention, each of the individual filtration systems 1100 is connected as a network to a central monitoring station 1300 (i.e., a computing system) where the output of all of the networked systems 1100 is monitored on a continuous basis to achieve compliance and protect against unauthorized discharge of contaminated water into the natural environment. In the exemplary embodiment shown in FIG. 13, three filtration systems 1100 according to the invention are disposed along an individual aquifer 1320, such as a stream. If the only wastewater sources on the stream 1320 are these three systems 1100, and if all effluent of these system 1100 are monitored, then the entire aquifer 1320 can be controlled simply by keeping track of the data generated by the three systems 1100. Of course, monitoring with appropriate measuring devices 1330 at the mouth of the stream 1100 where it exits into a waterway 1340 (such as a river) can insure compliance by the three filtration systems 1100. But, control of the three filtration systems' 1100 output, whether locally or at the central monitoring station 1300, insures that effluent is not placed into the stream 1320 when above minimum permissible tolerances.

Each of the filtration systems 1100 can communicate to the central monitoring station 1300 in any way. In FIG. 13, for example, the communication is shown as occurring wirelessly through respective communication towers 1350. In the macro view of the river 1340, pollution control can be carried out by monitoring not only the three filtration systems 1100 on the stream filtration systems 1320, but also other filtration systems 1100 along the river 1340 itself. With real time monitoring and recording of data from all of the filtration systems 1100 along the various waterways 1320, 1340, pollutant-free verification can occur easily. As such, the invention provides continuous water treatment capability to a large number of distributed filter systems (e.g., physically separate and, possibly, far apart from one another) at a cost that is many factors cheaper than the cost of a conventional sewer system.

The invention, therefore, creates a virtual wastewater treatment monitoring and control system having a network of independent treatment or filtration systems that are instrumented to measure critical process parameters such as process flows, containment water levels, water temperature, pH, nutrient concentration, total suspended solids, actual and potential effects of local weather conditions, and others. The data produced and recorded by these individual sub-systems are, then, transmitted electronically and captured at a central monitoring system of the invention, at which the received data is further analyzed and used to manage the systems remotely. The invention, thereby, provides oversight to the control and operation of the treatments systems being monitored. Not only does the inventive filter system 1100 decrease the space required at a particular wastewater generator, it turns it into a self-contained wastewater treatment plant that can be certified by any appropriate authority for having discharged no wastewater or only an exact, known, permissible quantity.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A wastewater treatment system for a watershed defining an aquifer or waterway, comprising:
   a network of independent wastewater treatment facilities, each of the independent wastewater treatment facilities having:
      wastewater treatment subsystems including:
         a wastewater collection subsystem for holding wastewater to be treated;
         a filter pump subsystem comprising a wastewater pump fluidically connected to the wastewater collection subsystem and operable to pump wastewater out from the wastewater collection subsystem;
         at least one filtration subsystem comprising at least one bioreactive filter fluidically connected to the wastewater pump and operable to filter wastewater received from the wastewater pump, the at least one bioreactive filter having:
            a sump defining a sump cavity for receiving wastewater therein;
            a fluidized-bed filter disposed in the sump cavity and supported upright by the sump, the fluidized-bed filter having an upwardly expanding, hollow, conical filter body and filter media inside the filter body; and
            an output fluidically connected to the fluidized-bed filter and operable to discharge filtered wastewater from the fluidized-bed filter;
         a monitoring subsystem comprising monitors operable to measure wastewater process parameters of the wastewater treatment subsystem selected from at least one of the group consisting of process flow, water level, water temperature, pH, nutrient concentration, total suspended solids, actual weather condition at the wastewater treatment facility, and effects of local weather condition on the wastewater treatment facility;
      control devices operable to receive at least one control command and, dependent upon the at least one control command received, to alter at least one parameter of at least one of the wastewater treatment subsystems; and
      a communication device operatively connected to the wastewater treatment subsystems and to the control devices and operable:
         to send information corresponding to the wastewater process parameters measured by the monitors;
         to receive control messages corresponding to the at least one control command; and
         to transmit the at least one control command to at least one of the control devices to, thereby, alter a wastewater process parameter;
   at least one monitor located to measure water that includes wastewater discharged from two or more of the independent wastewater treatment facilities and operable to monitor water quality parameters of the watershed; and
   a central monitoring location operable to manage the watershed by:
      receiving the information corresponding to the wastewater process parameters from each communication device;
      evaluating if changes are to be made by at least one of the independent wastewater treatment facilities;
      sending the control messages to at least one of the independent wastewater treatment facilities; and
      at least one of regulating and diverting discharge from the independent wastewater treatment facilities to maintain compliance with permissible, monitored watershed parameter tolerances.

2. The wastewater treatment system according to claim 1, wherein the wastewater collection subsystem includes a solids separator.

3. The wastewater treatment system according to claim 1, wherein the central monitoring location includes a central processing system having a transceiver operable to communicate with the communication device, the central processing system being operable to receive the information from each communication device of the wastewater treatment facilities and to transmit at least one control message to each communication device.

4. The wastewater treatment system according to claim 3, wherein the central processing system is programmed to capture, process, and record the received information and, then, remotely operate each wastewater treatment facility by sending the at least one control message.

5. The wastewater treatment system according to claim 4, wherein the control devices comprise at least one of the group consisting of cameras, valves, pumps, chemical dispensers, relays, switches, and facility shut down devices.

6. The wastewater treatment system according to claim 1, wherein the at least one bioreacting filter has one aerobic filter stage and two anaerobic filter stages.

7. The wastewater treatment system according to claim 3, wherein the central processing system comprises a personal computer and the communication device comprises a communication connection to the Internet.

8. The wastewater treatment system according to claim 1, wherein each of the wastewater treatment subsystems comprises:
   a throughput rate; and
   a turnover rate independent of the throughput rate.

9. A distributed wastewater treatment system for a watershed defining an aquifer or waterway, comprising:
   a network of distributed wastewater treatment facilities operatively unconnected to a central, downstream wastewater treatment facility, each of the distributed wastewater treatment facilities having:
      wastewater treatment subsystems including:
         a wastewater collection subsystem for holding wastewater to be treated;
         a wastewater pump subsystem comprising a wastewater pump fluidically connected to the wastewater collection subsystem and operable to pump wastewater out from the wastewater collection subsystem and a treatment device operable to treat wastewater received from the wastewater pump; and
         a monitoring subsystem comprising at least one monitor operable to measure wastewater process parameters of the wastewater treatment subsystems selected from at least one of the group consisting of process flow, water level, water temperature, pH, nutrient concentration, total suspended solids, actual weather condition at the wastewater treatment facility, and effects of local weather condition on the wastewater treatment facility;
      at least one control device operable to receive at least one control command and, dependent upon the at least one control command received, to alter at least one parameter of at least one of the wastewater treatment subsystems; and
      a communication device operatively connected to at least one of the wastewater treatment subsystems and the at least one control device and operable:
         to transmit information corresponding to the measured wastewater process parameters;
         to receive control messages corresponding to the at least one control command; and to transmit the at least one control command to the at least one control device to, thereby, alter a wastewater process parameter;

at least one monitor located to measure water that includes wastewater discharged from two or more of the distributed wastewater treatment facilities and operable to monitor water quality parameters of the watershed; and a central monitoring location operable to manage the watershed by:
receiving the information corresponding to the wastewater process parameters from each communication device;
evaluating if changes are to be made by at least one of the independent wastewater treatment facilities;
sending the control messages to at least one of the independent wastewater treatment facilities; and
at least one of regulating and diverting discharge from the independent wastewater treatment facilities to maintain compliance with permissible, monitored watershed parameter tolerances.

10. The wastewater treatment system according to claim 9, wherein the treatment device is at least one filtration subsystem comprising at least one filter fluidically connected to the wastewater pump and operable to filter wastewater received from the wastewater pump.

11. The wastewater treatment system according to claim 10, wherein the at least one filter comprises at least one bioreactive filter having:
a sump defining a sump cavity for receiving wastewater therein;
a fluidized-bed filter disposed in the sump cavity and supported upright by the sump, the fluidized-bed filter having an upwardly expanding, hollow, conical filter body and filter media inside the filter body; and
an output fluidically connected to the fluidized-bed filter and operable to discharge filtered wastewater from the fluidized-bed filter.

12. The wastewater treatment system according to claim 9, wherein the wastewater collection subsystem includes a solids separator.

13. The wastewater treatment system according to claim 9, wherein the central monitoring location includes a central processing system having a transceiver operable to communicate with the communication device, the central processing system being operable to receive the information from each communication device of the wastewater treatment facilities and to transmit at least one control message to each communication device.

14. The wastewater treatment system according to claim 13, wherein the central processing system is programmed to capture, process, and record the received information and, then, remotely operate each wastewater treatment facility by sending the at least one control message.

15. The wastewater treatment system according to claim 13, wherein the central processing system comprises at least one of a personal computer and a workstation, and the communication device comprises a communication connection to the Internet.

16. The wastewater treatment system according to claim 9, wherein the at least one control device comprises at least one of the group consisting of cameras, valves, pumps, chemical dispensers, relays, switches, and facility shut down devices.

17. The wastewater treatment system according to claim 11, wherein the at least one bioreacting filter has one aerobic filter stage and two anaerobic filter stages.

18. The wastewater treatment system according to claim 9, wherein each of the wastewater treatment subsystems comprises:

a throughput rate; and
a turnover rate independent of the throughput rate.

19. A wastewater treatment system for a watershed defining an aquifer or waterway, comprising:
a network of independent wastewater treatment facilities operatively unconnected to a central, downstream wastewater treatment facility, each of the independent wastewater treatment facilities having:
wastewater treatment subsystems including:
a wastewater collection subsystem for holding wastewater to be treated;
a wastewater pump subsystem comprising a wastewater pump fluidically connected to the wastewater collection subsystem and operable to pump wastewater out from the wastewater collection subsystem and a treatment device operable to treat wastewater received from the wastewater pump; and
a monitoring subsystem comprising at least one monitor operable to measure wastewater process parameters of the wastewater treatment subsystems selected from at least one of the group consisting of process flow, water level, water temperature, pH, nutrient concentration, total suspended solids, actual weather condition at the wastewater treatment facility, and effects of local weather condition on the wastewater treatment facility;
at least one control device operable to receive at least one control command and, dependent upon the at least one control command received, to alter at least one parameter of at least one of the wastewater treatment subsystems; and
a communication device operatively connected to at least one of the wastewater treatment subsystems and the at least one control device and operable:
to transmit information corresponding to the measured wastewater process parameters;
to receive control messages corresponding to the at least one control command; and
to transmit the at least one control command to the at least one control device to, thereby, alter a wastewater process parameter;
at least one monitor located to measure water that includes wastewater discharged from two or more of the independent wastewater treatment facilities and operable to monitor water quality parameters of the watershed; and
a central monitoring location operable to manage the watershed by:
receiving the information corresponding to the wastewater process parameters from each communication device;
evaluating if changes are to be made by at least one of the independent wastewater treatment facilities;
sending the control messages to at least one of the independent wastewater treatment facilities; and
at least one of regulating and diverting discharge from the independent wastewater treatment facilities to maintain compliance with permissible, monitored watershed parameter tolerances.

20. The wastewater treatment system according to claim 19, wherein each of the wastewater treatment subsystems comprises:
a throughput rate; and
a turnover rate independent of the throughput rate.

* * * * *